US007281338B2

(12) United States Patent
Ziegmann et al.

(10) Patent No.: US 7,281,338 B2
(45) Date of Patent: Oct. 16, 2007

(54) SLIDE MOUNTING TOOLS, KITS AND SYSTEMS CONTAINING SAME AND METHODS RELATED THERETO

(75) Inventors: Neil Ziegmann, Kiron, IA (US); Jeff Ziegmann, Kiron, IA (US)

(73) Assignee: NPZ Inc., Kiron, IA (US)

( * ) Notice: Subject to any disclaimer, the term of this patent is extended or adjusted under 35 U.S.C. 154(b) by 122 days.

(21) Appl. No.: 10/954,637

(22) Filed: Sep. 30, 2004

(65) Prior Publication Data

US 2005/0102816 A1 May 19, 2005

Related U.S. Application Data

(60) Provisional application No. 60/507,319, filed on Sep. 30, 2003.

(51) Int. Cl.
*G01D 21/00* (2006.01)

(52) U.S. Cl. ............................ 33/645; 33/474; 33/481; 33/667

(58) Field of Classification Search .................. 33/427, 33/429, 474, 480, 481, 194, 667, 645
See application file for complete search history.

(56) References Cited

U.S. PATENT DOCUMENTS 2,761,215 A * 9/1956 Macklanburg ............... 33/343

(Continued)

OTHER PUBLICATIONS

"House of Tools Woodworking", (Fall/Winter 2003),p. 52 (and cover).
"Kreg Tool Company", (*6th Edition*), (Summer 1998),p. 18 (and cover).
"Lee Valley & Veritas® Hardware Catalog 2002/2003", pp. 104-109, 148-149 (and cover).
"Rockler® Woodworking and Hardware", Catalog, (Summer III 2003),2 Pages (including cover).
"Sommerfeld's Tools for Wood", Catalog 7, (published prior to Sep. 2003), 2 Pages (including cover).

*Primary Examiner*—Christopher W Fulton
(74) *Attorney, Agent, or Firm*—Schwegman, Lundberg, Woessner & Kluth P.A.

(57) ABSTRACT

Slide mounting tools are disclosed, including a magnetic slide mounting tool having at least one magnet for mounting a slide to a surface. In one embodiment, a first section of a slide can be magnetically coupled to the slide mounting tool and installed on a stationary component. In one embodiment, at least one magnet is oriented substantially vertically on the slide mounting tool for magnetic coupling with the first section of the slide during installation of the section on edge against a vertical surface. The magnetic mounting tool thus allows, for the first time, a user to not only magnetically couple a stationary component section of virtually any type of slide to a stationary component, but provides a design that allows an extension slide to be extended while clamped to the stationary component, thus allowing a single user to align, clamp, extend and install a stationary component section of a slide without any outside assistance. A non-magnetic slide mounting tool having a first substantially vertical surface clampable to a stationary component, the non-magnetic slide mounting tool further having a second substantially vertical surface perpendicular to the first substantially vertical surface is also disclosed. The non-magnetic mounting tools also allows, for the first time, a single user to align and install moving component sections, as well as stationary component sections of slides without any outside assistance.

54 Claims, 25 Drawing Sheets

U.S. PATENT DOCUMENTS

| | | | | |
|---|---|---|---|---|
| 3,499,225 | A * | 3/1970 | Darrah | 33/347 |
| 4,984,762 | A | 1/1991 | Braun et al. | |
| 5,855,073 | A * | 1/1999 | Boelling | 33/533 |
| 6,273,534 | B1 | 8/2001 | Bueley et al. | |
| 6,367,900 | B1 | 4/2002 | Woerner | |
| 6,390,576 | B1 | 5/2002 | Walburn | |
| 6,442,853 | B1 * | 9/2002 | Hale et al. | 33/194 |
| 6,474,761 | B1 | 11/2002 | Müterthies et al. | |
| 6,729,033 | B2 * | 5/2004 | Jevons et al. | 33/481 |
| 7,009,480 | B2 * | 3/2006 | Tsui et al. | 335/287 |
| 7,055,256 | B2 * | 6/2006 | Alecci | 33/392 |
| 2002/0069541 | A1 * | 6/2002 | Sumner | 33/194 |
| 2005/0257389 | A1 * | 11/2005 | Pierson et al. | 33/194 |
| 2005/0278962 | A1 * | 12/2005 | Klonowski, III | 33/194 |

* cited by examiner

SLIDE MOUNTING TOOLS, KITS AND SYSTEMS CONTAINING SAME AND METHODS RELATED THERETO

CROSS-REFERENCE TO RELATED APPLICATION

This application claims the benefit under 35 U.S.C. 119(e) of U.S. Provisional Application No. 60/507,319 filed on Sep. 30, 2003, which is hereby incorporated by reference in its entirety.

FIELD

This invention relates generally to mounting tools, and, more particularly, to slide mounting tools and methods of using same.

BACKGROUND

Proper functioning of drawers or pull-out shelves in cabinetry, desks, entertainment centers and the like, requires careful installation of a slide comprised of a stationary component section and a moving component section. Together, these two sections allow the moving component to slide in and out of an opening in the stationary component. Such slides are commonly referred to as "drawer slides" even when used for shelves. Although both sections need to be installed properly, the stationary component section is known to be particularly difficult to align accurately.

The stationary component section of various types of slides can be installed against a vertical surface (typically in pairs on either side of an opening) in a substantially horizontal position lengthwise, but with its width portion oriented "vertically" with edges positioned on the top and bottom, i.e., on "edge". Alternatively, the stationary component sections can be installed in the center of the opening, again in a substantially horizontal position lengthwise, but with its width portion oriented "horizontally" with edges positioned on either side, i.e., in a "flat" position. One type of slide installed against a vertical surface is a bottom mount slide. With the bottom mount slide, two stationary component sections are typically installed on edge on either side of the opening in the stationary component. A moving component, sized to be inserted into this opening, has a corresponding pair of moving component (slide) sections located on each outer side. (The corresponding moving component sections of these slides are typically installed on a drawer nearest the bottom surface, hence the term "bottom mount" slide). However, current alignment tools for aligning the stationary component (slide) sections within the stationary component are specific to particular brands and/or sizes of slide such that there is no flexibility to accommodate varying sizes and/or types of slides. As a result, many different sizes and types of tools are needed to install different brands and sizes of stationary component sections for bottom mount slides. Additionally, many alignment tools rely on springs to pinch the top and bottom surfaces of the stationary component (slide) section and hold it in place. However, the presence of a spring limits the height of the stationary component section that can be installed and hence the overall height of the slide that can be used.

In addition to bottom mount slides, there are also various types and sizes of extension slides, each having a stationary component section and a moving component section as described above. Extension slides include full-extension slides and partial-extension slides. Partial extension slides include both European-styled low profile slides, commonly referred to as "Euro" slides, and bottom center mount slides. A full-extension slide is typically installed so that the section containing the extender portion, i.e., the "extender," is located on the stationary component and is therefore considered part of the stationary component section of the slide. In contrast, partial extension slides are typically installed so that the section containing the "extender" is installed on the moving component, such that the non-extending section of the slide is the stationary component section.

Full-extension slides can be installed on edge to, i.e., against, vertical surfaces (typically in pairs on either side of an opening) or in a flat position in the center of an opening as center bottom mount slides. However, with regard to partial extension slides, only the Euro slide can be installed both on vertical surfaces and in the center of the opening. Partial extension slides designed to be used only as center bottom mount slides are not intended to be installed on edge to vertical surfaces.

It should be noted that both fill and partial extension slides are useful in most any type of application, including "Euro" cabinets which have no face frame as well as conventional face-frame cabinets. However, there are currently no "alignment" tools made specifically for installation of the stationary component section of either the full-extension slide or the center mount bottom slide. Instead, various makeshift devices, such as templates with pilot holes, are used to install the stationary component section of a full-extension slide. Additionally, there are no tools designed specifically for aligning moving component sections of center-mounted slides onto moving components. Similarly, center bottom mount slides are currently installed using a tape measure, and possibly a level to align the slide properly within the stationary component. Such devices can be cumbersome to use and require at least a two-step process for installation. Although there are alignment tools available for installing the stationary component section of a Euro slide, these tools have the same limitations as described above (for bottom mount slides installed on vertical surfaces) with regard to being brand and/or size specific.

For the reasons stated above, and for other reasons stated below which will become apparent to those skilled in the art upon reading and understanding the present specification, there is a need in the art for improved slide mounting tools and methods.

SUMMARY

A magnetic slide mounting tool having at least one magnet for mounting a slide to a surface is disclosed. In one embodiment, the slide is a stationary component slide section which can be magnetically coupled to the slide mounting tool either on edge or in a flat position and installed on a stationary component. In one embodiment, the stationary component slide section is part of a bottom mount slide or an extension slide. In one embodiment, the extension slide is a full-extension slide. In another embodiment, the extension slide is a partial extension slide, such as a Euro slide or center mount bottom slide.

In one embodiment, at least one magnet is oriented substantially vertically on the magnetic slide mounting tool for magnetic coupling with the stationary component section during alignment and installation of the stationary component slide section on edge against a vertical surface. In another embodiment, at least one magnet is additionally or alternatively oriented substantially horizontally on the magnetic slide mounting tool for magnetic coupling with the stationary component slide section of the slide during alignment and installation of the stationary component slide section in a flat position. In one embodiment, one or more of the magnets are combined with cups to increase their magnetic force. In a particular embodiment, rare earth magnets are used.

The present invention further provides an apparatus comprising an upper handle contiguous with a lower handle, wherein one or more magnets are secured to the upper handle; a substantially horizontal component contiguous with the upper handle, wherein one or more magnets are secured to the substantially horizontal component; and a substantially vertical component contiguous with the lower handle.

The present invention also provides a method comprising magnetically coupling a stationary component slide section with a magnetic slide mounting tool. In one embodiment, the method further comprises contacting the stationary component slide section with a stationary component using the magnetic slide mounting tool. In one embodiment, the stationary component slide section is positioned using markings on the magnetic slide mounting tool.

The present invention further provides a method comprising grasping a magnetic slide mounting tool; magnetically coupling a first slide section to the magnetic slide mounting tool; contacting the first slide section with a first surface using the magnetic slide mounting tool, positioning the first slide section on the first surface for use with a second slide section located on a second surface; and securing the first slide section to the first surface. In one embodiment, the first surface is part of a stationary component and the second surface is part of a moving component. In one embodiment, the first surface is a substantially vertical planar surface. In one embodiment, the first surface comprises a front substantially horizontal surface and a rear substantially vertical surface. In one embodiment, the slide contacts the rear substantially vertical surface indirectly with a socket.

The magnetic slide mounting tool allows a user, for the first time, to properly align slides of varying sizes, brands, types and shapes with just a single device. Embodiments of the invention further provide an apparatus comprising a non-magnetic slide mounting tool having a first substantially vertical surface clampable to a stationary component, such as a cabinet, the non-magnetic slide mounting tool further having a second substantially vertical surface perpendicular to the first substantially vertical surface. In one embodiment the first substantially vertical surface is clampable to the stationary component with the second substantially vertical surface extending in an outwardly-facing direction. In one embodiment, a moving component, such as a drawer or shelf, can be balanced on top of two non-magnetic slide mounting tools when the tools are clamped to either side of an opening in the stationary component, wherein a moving component slide section can be aligned and installed on the moving component in a position to interact with a stationary component slide section installed on the stationary component. In one embodiment, the moving component slide section is engaged with the stationary component slide section during installation of the moving component slide section on the moving component. In one embodiment, the stationary component is a structure selected from the group consisting of cabinets, desks, armoires, entertainment centers, dressers, pantries and trucks and the moving component is a drawer or shelf. In one embodiment the apparatus further comprises a substantially horizontal tab portion contiguous with a substantially horizontal support portion in contact with the first and second substantially vertical surfaces; wherein the tab portion is designed to contact a top surface of a front rail secured to the stationary component.

In one embodiment, the first substantially vertical surface is clampable to the stationary component with the second substantially vertical surface extending in an inwardly-facing direction. In one embodiment, the stationary component is a frameless cabinet and a moving component is balanced on top of two non-magnetic slide mounting tools when the tools are clamped to either side of an opening in the stationary component, wherein a moving component section of a slide can be aligned and installed on the moving component in a position to interact with a stationary component slide section installed on the stationary component. In one embodiment, two moving component sections of two slides can be aligned and installed on opposing outer surfaces of the moving component, each in a position to interact with a stationary component slide section installed on a vertical surface of the stationary component.

In one embodiment, a stationary component section of a slide can be aligned on a top surface of the non-magnetic slide mounting tool clamped in an inwardly-facing direction, and installed on edge against a vertical surface, the stationary component section positioned to interact with a moving component slide section installed on a moving component, such as a drawer or slide. In one embodiment, two stationary component slide sections are installed on edge against a vertical surface for use with two moving component sections installed on either side of the drawer or shelf. In one embodiment, the stationary component section is part of a bottom-mount slide, a full-extension slide or a partial-extension slide. In one embodiment, the non-magnetic slide mounting tool is made from materials selected from the group consisting of wood, metal and plastic.

The invention further comprises an apparatus comprising a first substantially vertical surface; a second substantially vertical surface substantially perpendicular to the first substantially vertical surface and connected to the first substantially vertical surface at one end; and a substantially horizontal surface contiguous with the second substantially vertical surface. In one embodiment, the apparatus further comprises a hatch mark section connected to the first and second substantially vertical surfaces. In one embodiment, the apparatus can be used to install a stationary component section of a slide to a stationary component or a moving component section of a slide to a moving component.

In one embodiment, the invention additionally or alternatively comprises a method for installing slides on a surface. The method comprises installing first slide sections on either side of an opening in a first surface; clamping a tool to each side of the opening; extending a second slide section engaged with each first slide section; balancing a second surface on the tools; and positioning the second slide sections on the second surface. In one embodiment, the first slide section is installed with a magnetic mounting tool. In one embodiment the first slide section is a stationary component section and the second slide section is a moving component section. In one embodiment, the first surface is connected to a frame and the tools are clamped in an outwardly-facing direction. In one embodiment, the first surface is not connected to a frame and the tools are clamped to the first surface in an inwardly-facing direction.

In one embodiment, the invention further comprises securing the second slide section to the second surface. In one embodiment, the second slide section is secured to the second surface with screws. In one embodiment, the first surface is a stationary component, such as a cabinet, and the second surface is a drawer or shelf. In one embodiment, the second slide section is further extended using a trip mechanism located in the first slide section to provide access to a rear portion of the second surface and second slide section to allow the second slide section to be secured to the second surface in the rear portion. In one embodiment, the invention further comprises unclamping the tools from the first surface. In one embodiment, a moving component section of a full-extension slide is aligned and mounted with this tool.

In one embodiment, the invention additionally or alternatively comprises a method for installing slides on a surface. The method comprises clamping a tool to one side of an opening in the surface in an inwardly-facing direction; balancing a slide section on top of the tool against the surface; and positioning the slide section on the surface. In one embodiment, the method further comprises installing the slide section to the surface. In one embodiment, the slide section is a stationary component section and the surface is a stationary component, such as a cabinet. In one embodiment, a stationary component section of any type of slide is aligned and mounted with this tool.

The invention further comprises a method comprising clamping a non-magnetic slide mounting tool having a support portion to a stationary component; and aligning a slide section with the non-magnetic slide mounting tool, the slide section positioned against a first vertical surface inside the stationary component. In one embodiment, the slide section is positioned using markings on the non-magnetic slide mounting tool. In one embodiment, the slide section is a stationary component section or a moving component section. In one embodiment, the non-magnetic slide mounting tool is clamped in an outwardly-facing direction to a front rail secured to the stationary component. In one embodiment, the method further comprises balancing a moving component on two tools clamped to opposing outer surfaces of the stationary component, wherein a moving component section of a slide can be installed on the moving component in a position to interact with a stationary component slide section installed on the stationary component. In one embodiment, each moving component section is in a position to interact with a stationary component slide section installed on a vertical surface of the stationary component. In one embodiment, the non-magnetic slide mounting tool is clamped in an inwardly-facing direction. In one embodiment, the method further comprises installing a second slide section against a second vertical surface inside the stationary component. In one embodiment, the slide section is positioned in a flat position between front and back surfaces of the stationary component. In one embodiment, the mounting tool has a substantially horizontal planar surface.

In one embodiment, prior to installing, the slide section is moved along a top surface of the substantially horizontal planar surface until properly positioned. In one embodiment, the slide further has a substantially vertical planar surface and, prior to installing, the slide is moved along a bottom surface of the substantially horizontal planar surface until the slide touches a front surface of the substantially vertical planar surface.

In one embodiment, the invention further comprises a method comprising aligning and installing a stationary component section of a full-extension slide on a stationary component with a magnetic slide mounting tool; and aligning and installing a moving component section of a full-extension slide on a moving component with a non-magnetic slide mounting tool.

In one embodiment, the invention further comprises a mounting system comprising a first mounting tool for magnetically coupling and aligning a stationary component slide section of a slide on a stationary component, the mounting tool having at least one magnet; and a second mounting tool for aligning a stationary component slide section of a slide on a stationary component or a moving component slide section on a moving component, the second mounting tool clampable to the stationary component.

In one embodiment, the invention further comprises a kit comprising a first mounting tool for aligning a stationary component slide section on a stationary component, the mounting tool having at least one magnet; a second mounting tool for aligning a moving component slide section on a moving component, the second mounting tool having a toe portion and clampable to the stationary component; and instructions for using the first and second mounting tools.

The magnetic mounting tools thus allows, for the first time, a user to not only magnetically couple a stationary component section of virtually any type of slide to a stationary component, but provides a design that allows an extension slide to be extended while clamped to the stationary component, thus allowing a single user to align, clamp, extend and install a stationary component section of a slide without any outside assistance. The non-magnetic mounting tools also allows, for the first time, a single user to align and install moving component sections, as well as stationary component sections of slides without any outside assistance.

DETAILED DESCRIPTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

Figure 1:
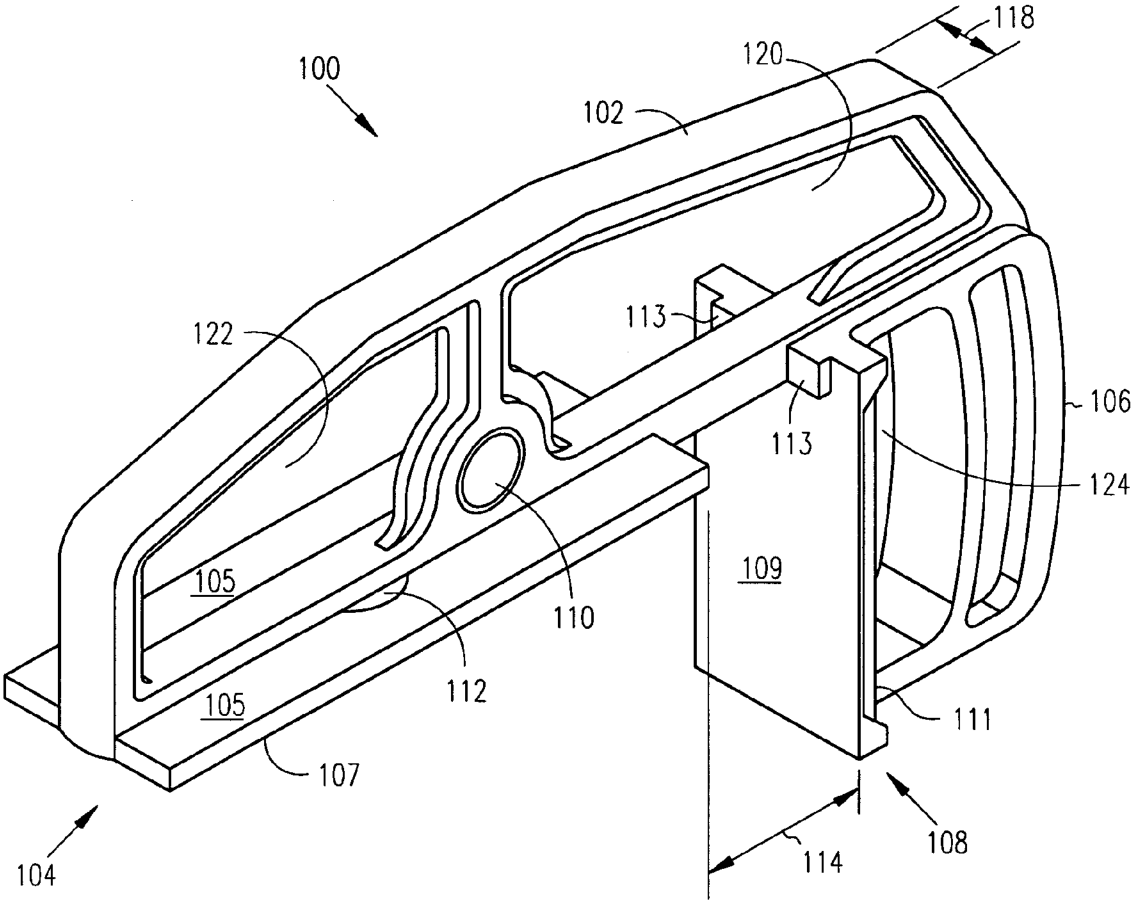
FIG. 1 is a perspective view of a magnetic slide mounting tool in one embodiment of the present invention.

Slide mounting tools are disclosed. As shown in FIG. 1, in one embodiment, the tool is a universal magnetic stationary slide component mounting tool (hereinafter "magnetic mounting tool") 100 comprised of an upper handle 102 having a substantially horizontal planar surface (hereinafter "horizontal component") 104 connected thereto and a lower handle 106 having a substantially vertical planar surface (hereinafter "vertical component") 108 connected thereto. The horizontal component 104 has a top surface 105 and a bottom surface 107. The vertical component 108 has a front surface 109 and a back surface 111. The front surface 109 has two lips 113 extending out from either side of the upper handle 102. The upper handle 102 further comprises one or more vertical magnets 110 located in a lower center portion, although the invention is not so limited. The vertical magnets 110 can be located in virtually any portion of the upper handle 102. The upper handle 102 can further comprise one or more horizontal magnets 112, with the one or more horizontal magnets 112 located in the horizontal component 104. In one embodiment, a seam 230 joins two halves of the magnetic mounting tool 100 together (See FIG. 2).

The magnetic mounting tool 100 can be any suitable size and shape as long as it can perform the intended function. Preferably, the magnetic mounting tool 100 is designed to not only allow for proper grasping by the user, but also to allow for virtually any size and type of slide to be securely coupled to at least one of the magnets 110 and 112 and installed in the desired location.

In one embodiment the length of the magnetic mounting tool 100, which essentially comprises the length of the upper handle 102, is between about six (6) to 12 in or more (about 15.2 to 30.5 cm), depending on the length of the stationary component portion being installed. In a particular embodiment, the magnetic mounting tool 100 is used with stationary component portions that do not exceed about ten (10) in (about 25.4 cm) in length and the maximum length of the magnetic mounting tool 100 is about 11.5 in (about 29.2 cm). In one embodiment, the magnetic mounting tool 100 has an overall maximum height of between about five (5) and seven (7) in (about 12.7 and 17.8 cm), i.e., the height of the upper handle 102 and lower handle 106 combined. The approximate height of the magnetic mounting tool 100 away from the lower handle 106, which is essentially the height of the upper handle 102 alone, is about three (3) to four (4) in (about 7.6 to 10.2 cm), although this dimension will vary, particularly in embodiments where the upper handle 102 is tapered as in FIG. 1. The size and shape of openings 120 and 122 in the upper handle 102 is preferably designed to allow all the screw holes in the slide being installed to be visible and accessible while the slide is magnetically coupled to the magnetic mounting tool 100, although the invention is not so limited. In some embodiments, only some of the screw holes may be visible and accessible. In one embodiment, the height of the openings 120 and 122 at their maximum dimension is between about two (2) and 2.5 in (about 5.1 and 6.4 cm). Again, these dimensions may vary with each opening and between the two openings 120 and 122, as the openings can be of any suitable shape, including irregularly shaped as shown in FIG. 1. Virtually any size, shape and number of openings can be utilized as long as the magnetic mounting tool 100 can perform its intended function. In some embodiments, the openings may be much smaller, although such a design would be more costly to manufacture and may limit accessibility to the screw holes of the slide being installed.

In one embodiment the upper handle 102 is narrower than and contiguous with the lower handle 106, although the invention is not so limited. However, the upper handle 102 should be of a sufficient width in its lower portion to house the desired number of upper magnets 110 (See FIG. 1). In a particular embodiment, the upper handle 102 has a width 118 of between about 0.25 and one (1) in (about 0.6 and 2.5 cm) and the lower handle 106 has a width 218 of between about 0.5 and two (2) in (about 0.6 and 5.1 cm) (See FIG. 2). In a particular embodiment, the upper handle 102 has a width 118 of about 0.5 in (about 1.3 cm) and the lower handle 106 has a width 218 of about one (1) in (about 2.5 cm).

The lower handle 106 should be sized to allow a user to easily grasp the magnetic mounting tool 100. If the lower handle 106 is too tall in height, its usefulness in smaller stationary components will be limited. If the lower handle 106 is too small, it will not provide sufficient support for the user during use. In one embodiment, the lower handle 106 has an opening 124 sized for all four fingers of a small to large-sized hand to grasp the magnetic mounting tool 100. In an exemplary embodiment, the opening 124 is between about two (2) and five (5) in (5.1 and 12.7 cm) in height and about one (1) to four (4) in (2.5 and 10.2 cm) in length. In another embodiment, the opening 124 is between about three (3) and four (4) in (7.6 to 10.2 cm) in height and about 1.5 to three (3) in (3.8 to 7.6 cm) in length.

The top surface 105 of the horizontal component 104 is designed to be used in conjunction with the vertical magnet 110 (as well as any horizontal magnet 112 present) to align a slide (not shown) on its edge against a substantially vertical surface. The top surface 105 of the horizontal component 104 is preferably designed so that a slide can be coupled to the top surface 105 on either side of the upper handle 102, thus providing added flexibility for the user, although the invention is not so limited. In an alternative embodiment, the horizontal component 104 is located on only one side of the upper handle 102. Preferably the width of the top surface 105 (of the horizontal component 104) extending out on either side of the upper handle 102 is sufficient to support any type of slide being installed. Additionally, if the magnetic mounting tool 100 is intended to also be used to install slides in a flat position such that there is a horizontal magnet 112, the horizontal component 104 needs to be sufficiently wide to house the horizontal magnet 112, as discussed below. Therefore, in such embodiments, use of the horizontal magnet 112 and bottom surface 107 should preferably also be taken into account when designing the proper width for the upper surface 105. In one embodiment, the width of the top surface 105 on either side of the upper handle 102 is at least as wide as the width of the slide being installed. In most embodiments, the width of the top surface 105 on either side of the upper handle 102 is at least about 25% up to about 150% the width of the slide being installed. If the horizontal component 104 is too wide in comparison with the slide being installed, it will make the magnetic mounting tool 100 more difficult to use. In a particular embodiment, the width of the top surface 105 on either side of the upper handle 102 is between about 0.4 and one (1) in (one (1) and 2.5 cm).

Preferably the length of the horizontal component 104 is of a dimension that allows coupling of a variety of slides. Specifically, it is desirable that a gap 114 exist between the end of the horizontal component 104 and the front surface 109 of the vertical component 108 as shown in FIG. 1 to accommodate slide ends extending below the straight edge of the remaining portion of the slide. In this way, the main portion of the slide can be flush against the top surface 105. This gap 114 can be any suitable distance. In most embodiments the gap 114 is at least about 0.5 in up to three (3) in (about 1.3 to 7.6 cm) in length.

The horizontal component 104 need only be as thick as required to perform its intended function and preferably does not flex during use. In one embodiment, the horizontal component 104 has a minimum thickness equal to the thickness of the one or more horizontal magnets 112. In the embodiment shown in FIG. 1, there is one horizontal magnet 112 which is also visible on the top surface 105 and further assists coupling a slide to the top surface 105 as well as the bottom surface 107. If the horizontal component 104 is too thick in relation to the horizontal magnet 112, it could prevent the one or more horizontal magnets 112 from imparting sufficient pulling strength on the slide, particularly for slides coupled to the bottom surface 107. In most embodiments the horizontal component 104 is between about 0.13 and 0.5 in (about 0.3 and 1.3 cm) thick. In an alternative embodiment, a thicker or longer magnet is used, which may require a thickness of up to one (1) in or more for the horizontal component 104.

The bottom surface 107 of the horizontal component 104 is designed to be used in conjunction with the horizontal magnet 112 and, in most embodiments, the front surface 109 of the vertical component 108, to align a slide that is oriented horizontally, i.e., in a flat position. Specifically, the front surface 109 of the vertical component 108 provides a surface perpendicular to the surface on which the slide is being installed, which allows the slide to be properly squared during installation. The bottom surface 107 of the horizontal component 104 is preferably wider than the horizontal magnet 112, although the invention is not so limited.

Figure 2:
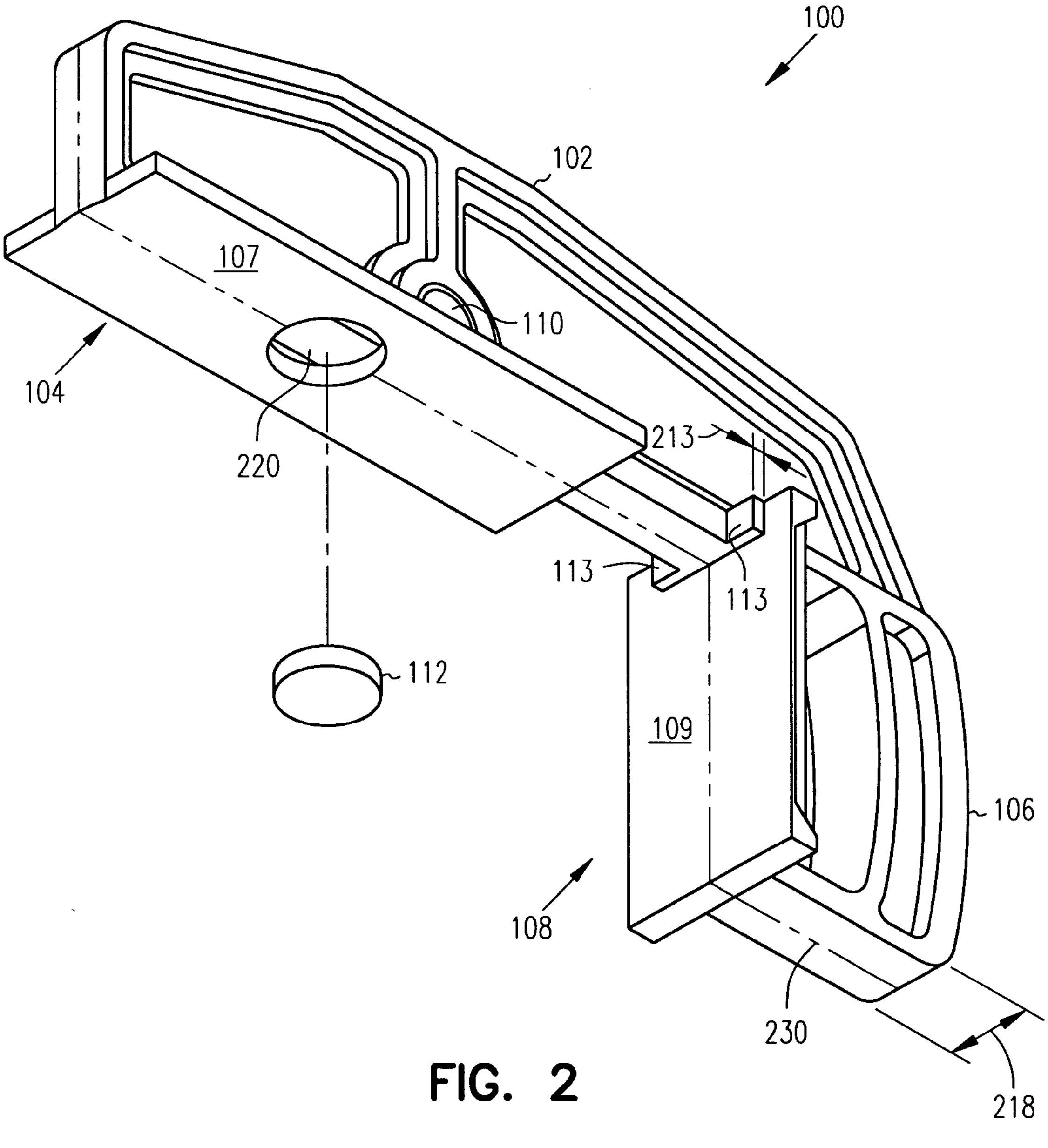
FIG. 2 is an exploded view of the tool shown in FIG. 1 from another perspective in one embodiment of the present invention.

Referring to FIG. 2, a single horizontal magnet 112 can be housed in a single horizontal magnet opening 220 as shown. The horizontal magnet 112 can be secured to the opening 220 by any suitable means. In one embodiment the horizontal magnet 112 is press fit into the horizontal magnet opening 220. In other embodiments, additional securing means can be used, as discussed below in relation to the vertical magnets 110, such as cups 318 (See FIG. 3). In one embodiment, there are two horizontal magnets 112 arranged in series, although the invention is not so limited. Multiple horizontal magnets 112 can also be arranged in parallel. In embodiments having two horizontal magnets 112 arranged in series, the magnets 112 can be secured in a single horizontal magnet opening 220 or in two separate and aligned openings 220 located on each side of the horizontal component 104. In other embodiments, there are multiple openings 220 along the horizontal components arranged in any suitable manner, e.g., staggered, in parallel, etc. Further details on the horizontal magnet 112 are provided below.

As shown in FIGS. 1 and 2, the vertical component 108 can also be of any sufficient size and shape as long as it can perform its intended function. In most embodiments the vertical component 108 is wider than the horizontal component 104 for proper functioning of the magnetic mounting tool 100. In one embodiment, the width of the vertical component 108 is at least 10% wider up to 40% wider than the horizontal component 104. In one embodiment, the width of the vertical component 108 is between about 0.5 in and four (4) in (about 1.3 and 10.2 cm). In a particular embodiment, the width of the vertical component 108 is between about two (2) and 2.5 in (5.1 and 6.35 cm). In an alternative embodiment, the vertical component 108 additionally or alternatively contains one or more magnets.

The vertical component 108 further contains lips 113 as described above. During use, a slide being installed on edge to a vertical surface is coupled with the top surface 105 in such a way so that one end abuts one of the lips 113. In this way, a slide can be installed away from the outermost edge of a stationary component the same distance as the thickness of the lip 113, i.e., distance 213, shown in FIG. 2. In one embodiment distance 213 is between about 0.235 and 0.5 in (about 0.3 and 1.3 cm). In most embodiments, distance 213 is about 0.25 in (about 0.64 cm). This feature is not available for slides being installed as bottom center mount slides using the lower surface 107 of the horizontal component 104. However, this feature is not important for such installations because it is desired to install such slides up to the outermost edge. Each lip 113 can also serve as a stop block for the fixed element of the stationary component section of the full-extension slide during installation when the slide is in an extended position, as described in more detail in FIG. 7C.

Figure 3:
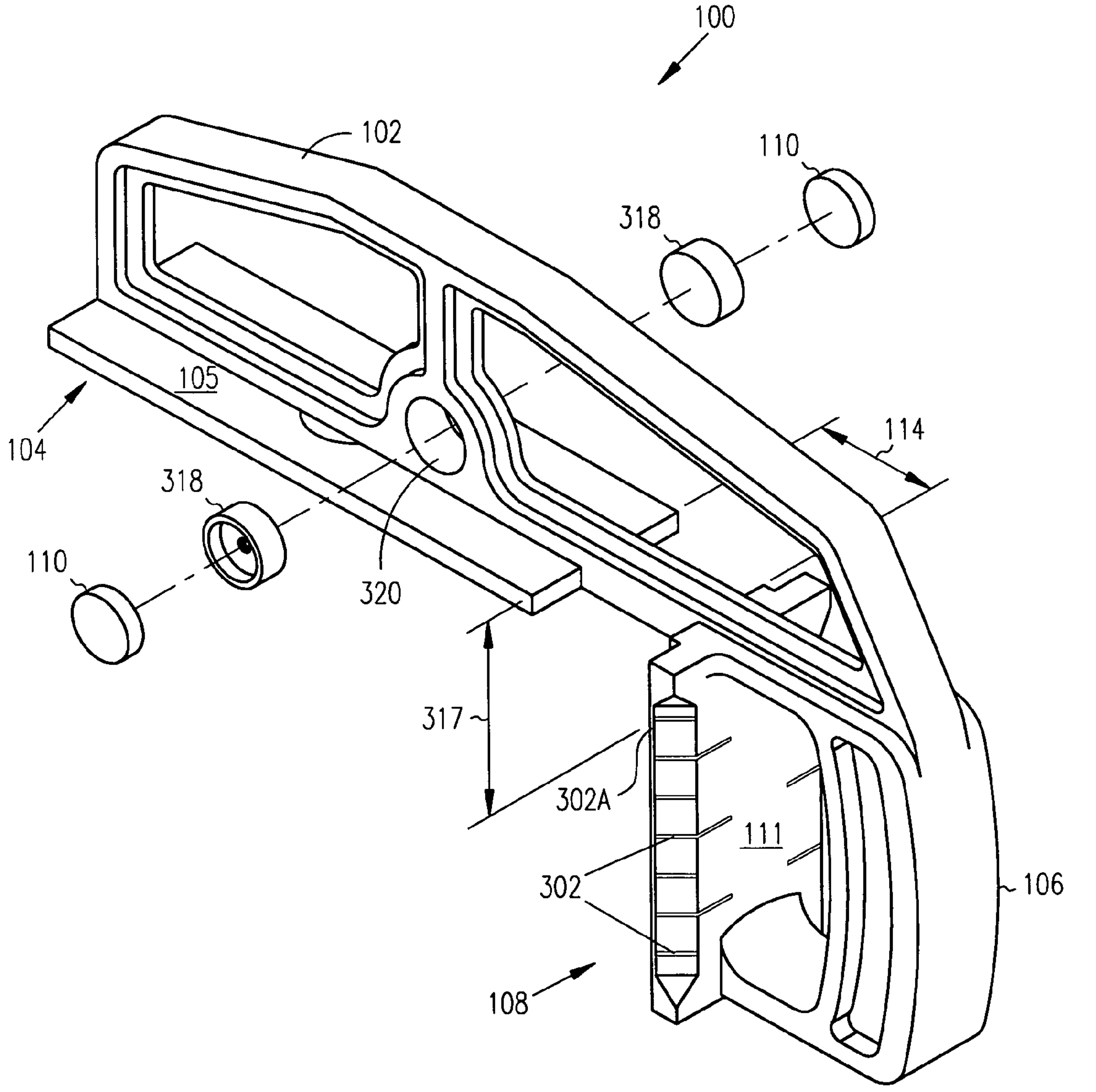
FIG. 3 is an exploded view of the tool shown in FIG. 1 from yet another perspective in one embodiment of the present invention.

Referring to FIG. 3, the back surface 111 of the vertical component 108 can also be provided with hatch marks 302 to assist in aligning a slide or a pair of slides against a substantially vertical surface. For example, if a drawer needs to be placed at a certain height, appropriate measurement lines can be marked on the vertical surface of the stationary component, corresponding with the desired height of the stationary component section of the slide being installed, or, more accurately, corresponding with the desired height less distance 317, as shown in FIG. 3. Specifically, by knowing the distance between the upper surface 105 of the horizontal component 104 and the top hatch mark 302A, i.e., distance 317, a slide magnetically coupled to the upper surface 105 can be installed a certain distance above the marking. In one embodiment, distance 317 is between about 0.25 and one (1) in (0.64 and 2.5 cm). In another embodiment, distance 317 is about 0.5 in (1.3 cm). For clarity in reading the hatch marks 302, each mark is alternately long and short, although the invention is not so limited. Typically such hash marks 302 are about 0.5 in (1.3 cm) apart, although any distance can be provided for the convenience of the user. In one embodiment, the hatch marks 302 are also or alternatively visible on the sides of the vertical component 108.

In the embodiment shown in FIG. 3, there are two vertical magnets 110 arranged in series, although the invention is not so limited. The vertical magnets 110 can also be arranged in parallel. In the embodiment shown in FIG. 3, each magnet 110 fits into a single vertical magnet opening 320, although the invention is not so limited. In other embodiments, there are two separate and aligned openings 320 on each side of the upper handle 102 to accommodate the two vertical magnets 110. In other embodiments, the upper handle 102 is configured to house additional magnets and there are multiple openings 320 along the upper handle 102 which are not aligned with each other. In some embodiments, these openings 320 can extend through the upper handle 102, but the invention is not so limited. In other embodiments, a single vertical magnet 110 fits into the single vertical magnet opening 320.

In the embodiment shown in FIG. 3, the vertical magnets 110 are not secured directly into their respective openings, but are instead placed inside cups 318 that are molded into the opening 320 during the formation of the magnetic mounting tool 100 in a molding process. In one embodiment, the cup 318 has a screw-hole as shown, for use with a screw, although such a feature may not necessarily be utilized herein. In other embodiments, each cup 318 is secured with adhesive means in addition to or instead of being molded into the opening or openings 320. Once the magnets 110 are placed in the cups 318, they preferably remain inside the cups essentially permanently, although the invention is not so limited. In a preferred design, however, the magnets 110 are so difficult to remove from their respective cups 318, that it is necessary to create a slot or notch of some sort in the cup 318 prior to insertion of the magnet 110 into the cup 318, in order to pry the magnet out. In most embodiments, the magnets 110 do not need additional securing means to stay within the cup, although any type of suitable securing means can be used, if desired. In one embodiment, cups 318 are also utilized with the horizontal magnet(s) 112 shown in FIG. 2.

The magnet openings 220 and 320 shown in FIGS. 2 and 3, respectively, can be formed during the manufacturing of the magnetic mounting tool 100, although the invention is not so limited. In another embodiment, the vertical and horizontal magnet openings 220 and 320, respectively, are formed after the rest of the magnetic mounting tool 100 is manufactured. The vertical and horizontal magnet openings 220 and 320 further can be any size and shape to accommodate their respective magnets 110 and 112, and do not necessarily have to be circular. In one embodiment, one or both of the openings 220 and 320 are square or rectangular shaped. In another embodiment, one or both openings 220 and 320 are crescent-shaped, diamond-shaped, ring-shaped, cylindrical-shaped or any other regular or irregular shape as desired, as long as a magnet can be properly secured therein.

Any suitable type of magnet 110 and 112 can be used in this device. The magnets 110 and 112 can also have at least any of the shapes noted above for the openings 220 and 320. In one embodiment, the magnets 110 and 112 are high-powered magnets, each having a direct-pull strength of up to 30 lbs (13.6 kg), although it is not expected that the direct-pull strength required to install the various types of slides is not greater than about 25 lbs (11.3 kg). In most embodiments the direct-pull strength required is between about one (1) and 50 lbs (0.45 and 22.7 kg), although higher direct-pull strength capabilities can be provided if desired. As noted above, in one embodiment magnet cups 318 are used to hold the magnets 110 and/or 112. Magnet cups 318 are known to increase the attractive power of a magnet by up to a factor of four. In another embodiment cups 318 are only used with magnets 110.

In one embodiment, rare-earth magnets are used. In one embodiment two rare-earth magnets having a diameter of between about 0.5 and one (1) in (1.3 and 2.5 cm) are used. In a particular embodiment, two 0.75 in (1.9 cm) diameter rare-earth magnet and cup assembly made by Lee-Valley Tools Ltd., having offices in Ogdensburg, N.Y., are used for the vertical magnets 110 and one or two diameter rare-earth magnets also made by Lee-Valley Tools Ltd. are/is used for the horizontal magnet 112. In other embodiments, various other larger or smaller diameter magnet and cup assemblies or individual magnets are used.

The magnetic mounting tool 100 can be made of any suitable material able to perform the intended function. In one embodiment the magnetic mounting tool 100 is made of wood, wood composites, any type of plastic (e.g., nylon, polyethylene, polystyrene, and so forth), any type of magnetic metal or metal alloy (e.g., steels), nonmagnetic metal alloy (e.g., aluminum, aluminum alloys), and so forth. In one embodiment 6063-T5 aluminum alloy is used. In another embodiment, a glass-filled, type 66 nylon is used. Use of a plastic adjustable holding device 100 may also provide a more rigid holding device as compared with certain types of conventional aluminum devices. If desired, the openings 220 and 320 can be reinforced with any type of material, such as hardened steel.

The components of the adjustable holding device 100 can be made using any suitable process, such as extrusion, injection molding, casting, and so forth. When produced in a die with an extrusion process, material-savings techniques can also be used, including forming openings in the handles 102 and 106. Furthermore, if the openings are made substantially symmetrical, the material flows through the die more easily and uniformly. In one embodiment, the tool 110 is made by joining together two symmetrical halves at the seam 230 (See FIG. 2). The handle openings do not need to be of any particular shape or size or located in any particular area of the magnetic mounting tool 100 as long as the magnetic mounting tool 100 is structurally sound and has dimensional stability. Such handle openings also help the resulting extrudate cool faster.

An added benefit of using injection molded plastic for the magnetic mounting tool 100 is that it allows the cups 318 to be inserted into the mold and secured into place during the molding process without causing weakening of the magnetic mounting tool 100. Since temperatures are generally lower as compared with aluminum or metal fabrication processing, use of an injection molding process has the added benefit of preventing weakening of the cups 318. The injection molding process is also more efficient, thus reducing costs, as compared with the time and labor involved in machining guides into a comparable aluminum or metal guide.

In other embodiments, only a portion of the magnetic mounting tool 100 is made by injection molding and other components, such as the horizontal component 104 and vertical component 108 are secured separately. In such embodiments, the horizontal and vertical components, 104 and 108, respectively, may be one continuous piece of material, if desired.

The various commercial slides used in the industry can be installed by the magnetic slide mounting tool on virtually any substantially flat surface or between two surfaces, such as in a center bottom mount installation. The slides can also be installed in either a vertical or horizontal orientation, depending on the particular application, as described herein. Stationary component sections can be installed in pairs to a vertical surface on either side of an opening in the stationary component or centered in the opening, typically with just the ends secured to the stationary component, either directly or indirectly. Such stationary components include, but are not limited to, any type of cabinet for indoor or outdoor use (including Euro-style and cabinets having face frames), armoires, entertainment centers, desks, including any type of computer desk, file cabinet, pantry, dresser, and so forth, to include virtually any type of object that has an opening designed to house a moving component intended to move back and forth on the slide or slides. Virtually any type of slide can be installed, including any type of extension slide, bottom center mount slide, bottom mount slide and the like, as discussed above. This includes, but is not limited to, over-the-top slides, drop-front slides, door slides (e.g., concealed, flipper, pocket), heavy duty slides for rolling tool cabinets, truck storage cabinets, etc.

Figure 4A:
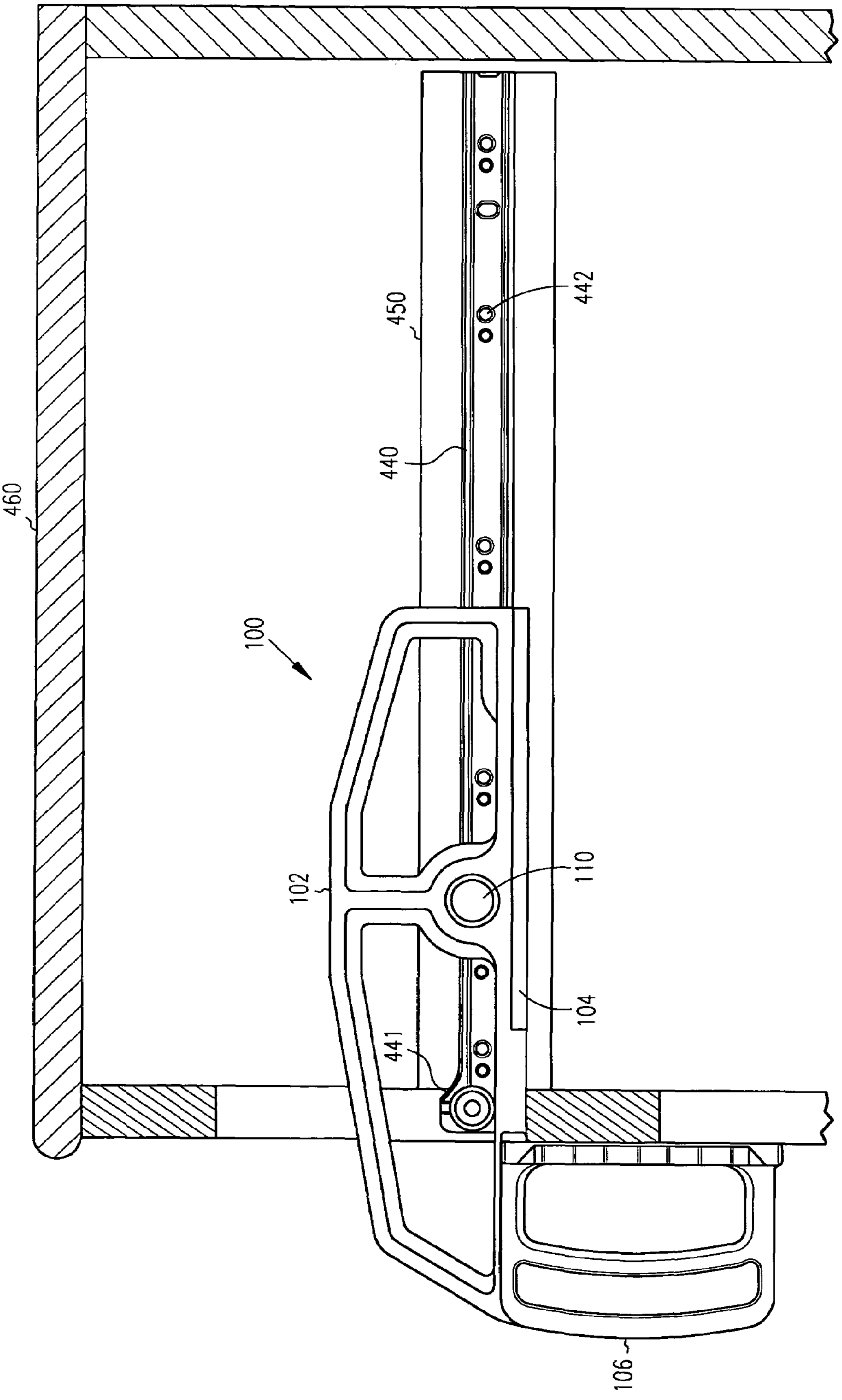
FIG. 4A is a side view of a magnetic slide mounting tool magnetically coupled to a stationary component section of a Euro slide during installation of the slide to a vertical surface in one embodiment of the present invention.

FIG. 4A is a side view of a magnetic mounting tool 100 magnetically coupled to a stationary component section 440 of a Euro slide during installation of the slide on its edge against a vertical surface 450 in one embodiment of the present invention. (The stationary component section of a "bottom mount slide" is very similar, but does not have the lower profile, i.e., height, throughout the length of the slide, as compared with the stationary component section of the Euro slide, is known in the art). The vertical surface 450 in this embodiment is a separate rail located inside a larger structure 460, such as a rail made from wood or metal, although the invention is not so limited. In some embodiments, the stationary component section 440 is installed directly onto the structure 460 without use of a rail.

Figure 4B:
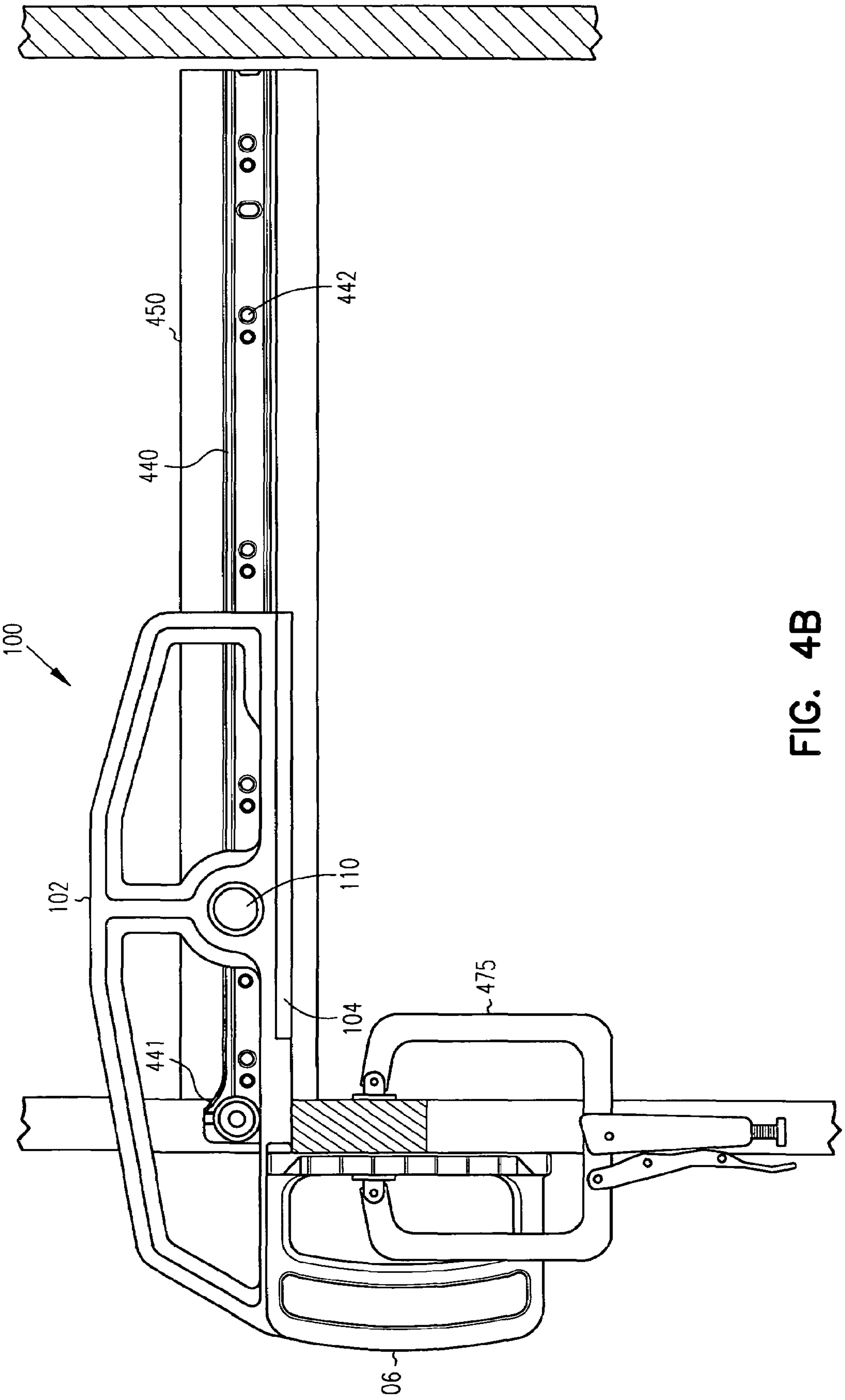
FIG. 4B is a side view of the tool and stationary component section of the Euro slide of FIG. 4A together with a clamp in one embodiment of the present invention.

In some embodiments, it may be advantageous to further utilize some type of handheld clamp 475 during installation as shown in FIG. 4B. In this way, the user has both hands free to finish installing the stationary component section 440 after it has been aligned with the magnetic mounting tool 100.

Figure 5:
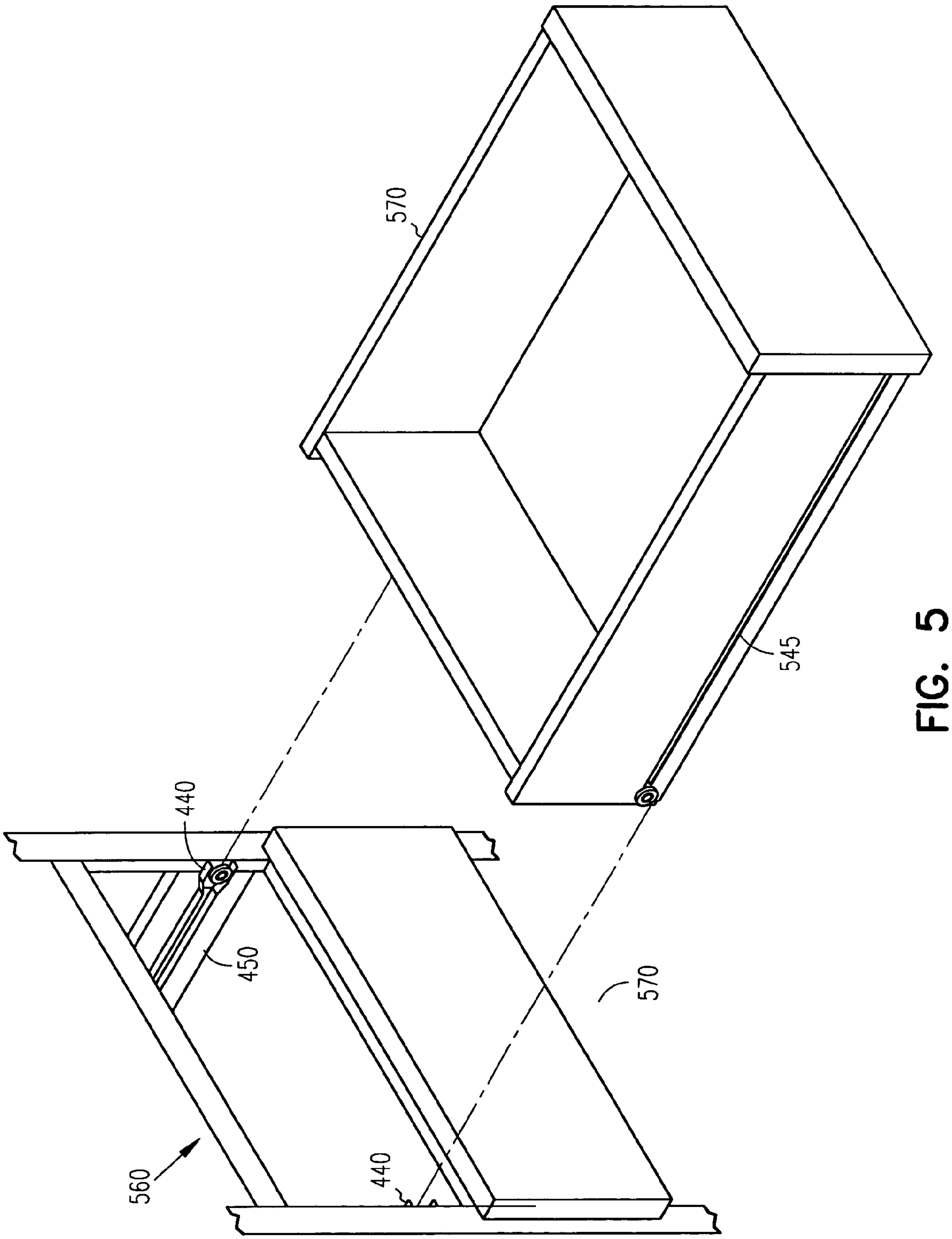
FIG. 5 is an exploded perspective view of a drawer assembly that utilizes two pair of Euro slides in one embodiment of the present invention.

After installation, the stationary component section 440 is positioned for use with a corresponding moving component section 545 of the Euro slide installed on a moving component 570 as shown in FIG. 5. In this embodiment, the moving component 570 is a drawer, although the invention is not so limited. In some embodiments, the moving component is any type of shelf. In most embodiments, the moving component section 545 is installed near the bottom of the drawer, although the invention is not so limited. In one embodiment, the moving component section 545 is installed higher up on the drawer side. In one embodiment, the moving component section 545 is installed anywhere on a shelf side. In most instances, a pair of stationary component sections 440 is installed at substantially the same height on either side of an opening in the stationary component, such as on stationary component rails 450. In an alternative embodiment, a single stationary component section 440 is used together with a single moving component section 545, such as with a narrow shelf, for example. Multiple pairs of stationary component sections 440 can be installed as needed, such as for a stack of two or more moving components, such as drawers or shelves or a combination thereof.

In the embodiment shown in FIG. 5, a first pair of stationary component sections (not shown) is already in place and engaged with the corresponding moving component sections of a drawer 570 that is shown in a closed position. A second pair of stationary component sections 440 is also already in place as can be seen, and ready for engagement with the corresponding moving component sections 545 (only one shown) installed on each of the outer side surfaces of the second drawer 570. A Euro slide 440 is typically useful in any type of application in which a bottom mount slide can be used in, but for which a lower profile may be desired as is known in the art.

Figure 6A:
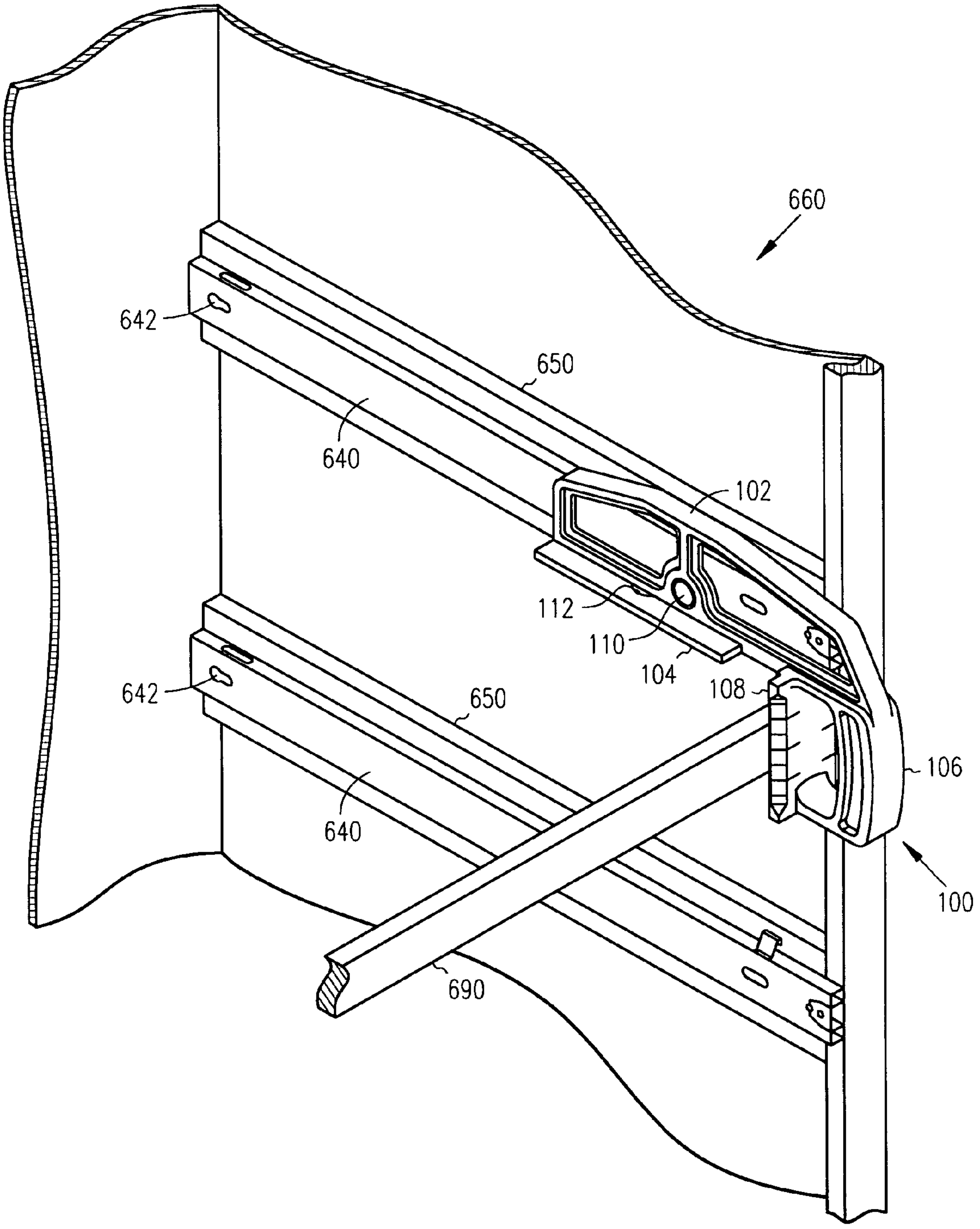
FIG. 6A is a perspective view of a magnetic slide mounting tool magnetically coupled to a stationary component section of a full-extension slide during installation of the stationary component section to a vertical surface in a structure having a front rail located in a first position, together with a second installed stationary component section of a second full-extension slide in one embodiment of the present invention.
Figure 6B:
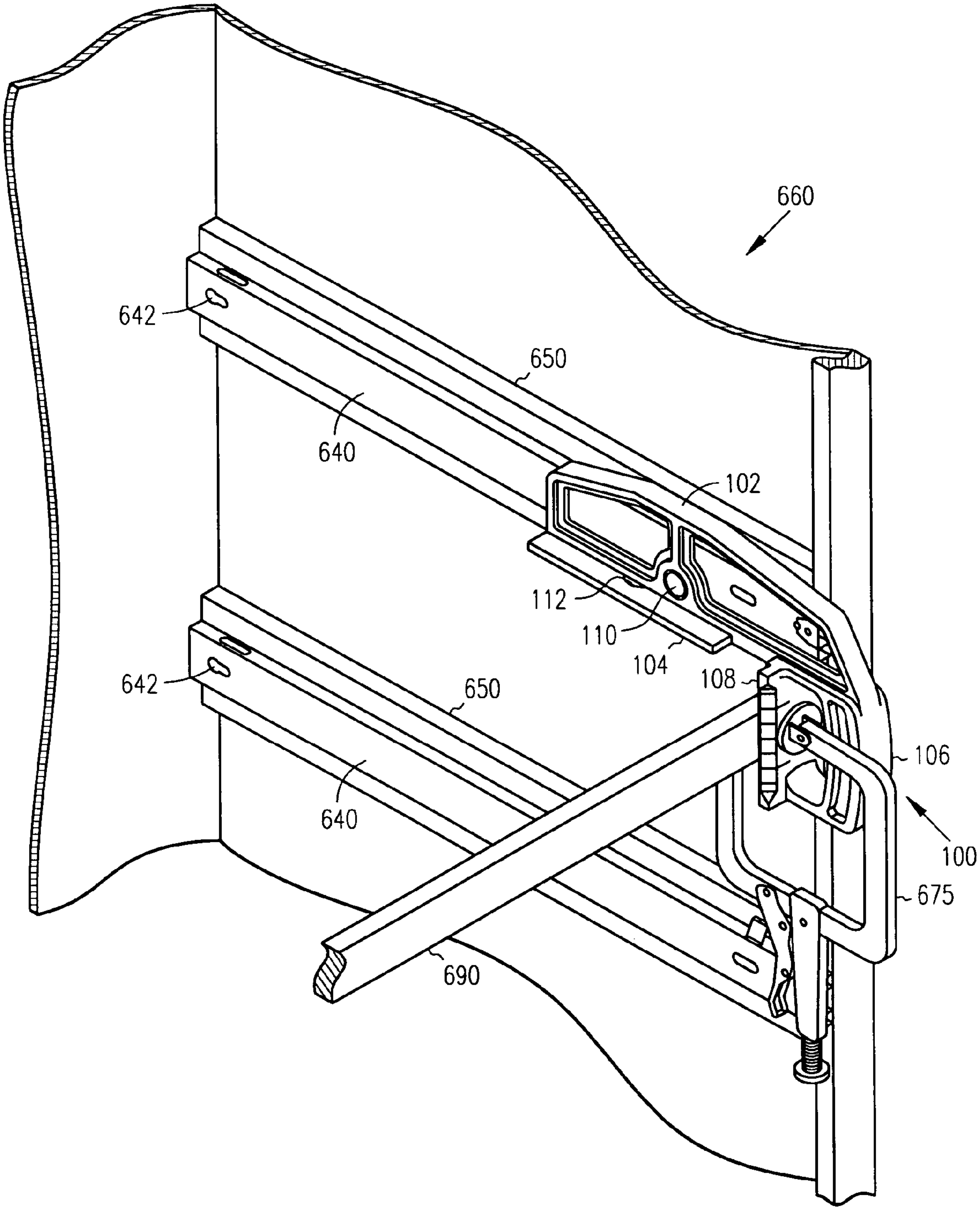
FIG. 6B is a perspective view of the tool and stationary component section of the full-extension slide of FIG. 6A together with a clamp in a first location in one embodiment of the present invention.
Figure 6C:
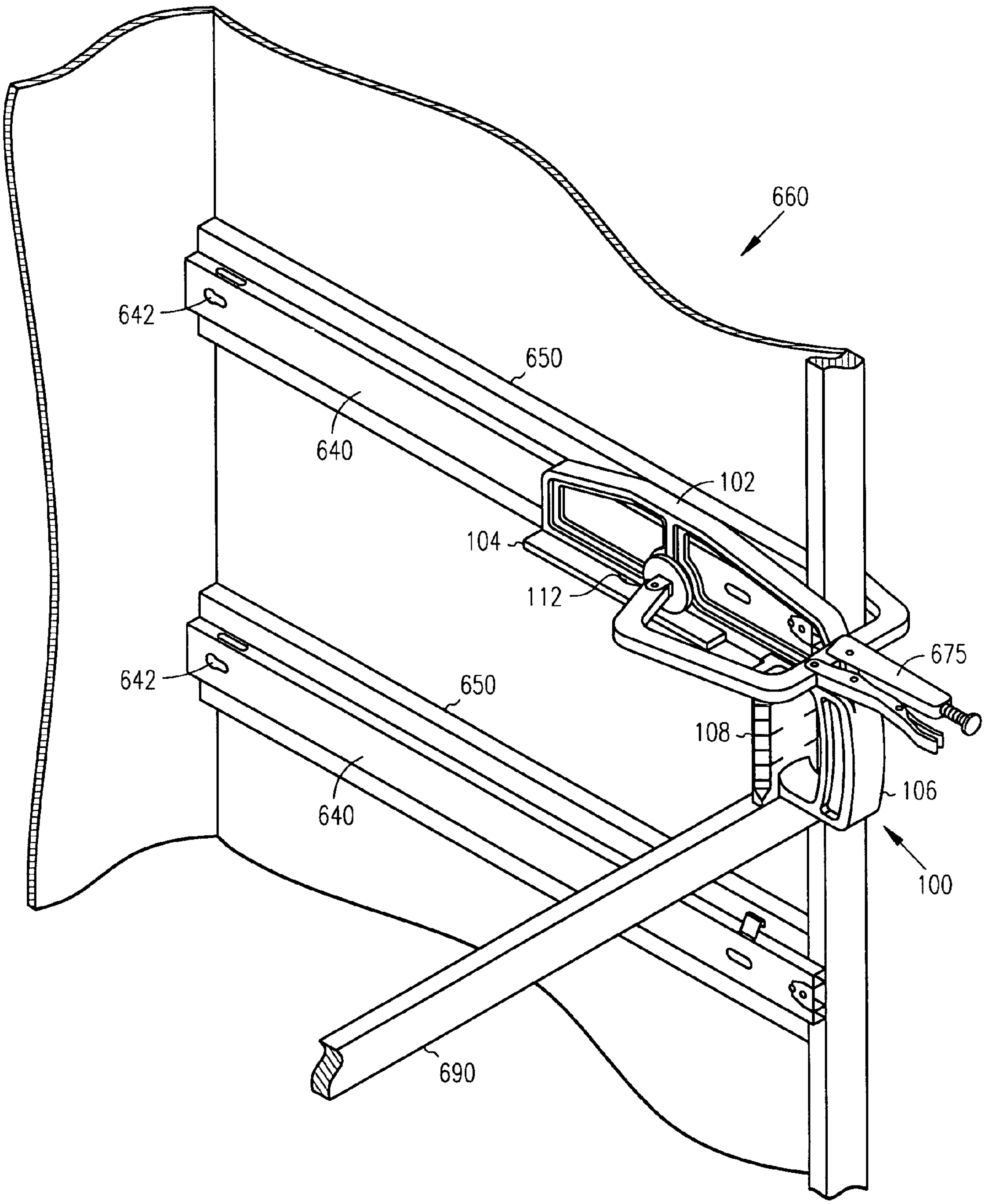
FIG. 6C is a perspective view of a magnetic slide mounting tool magnetically coupled to a stationary component section of a full-extension slide during installation to a vertical surface in a structure having a front rail located in a second position, together with a clamp in a second location and a second installed stationary component section of a second full-extension slide in one embodiment of the present invention.
Figure 6D:
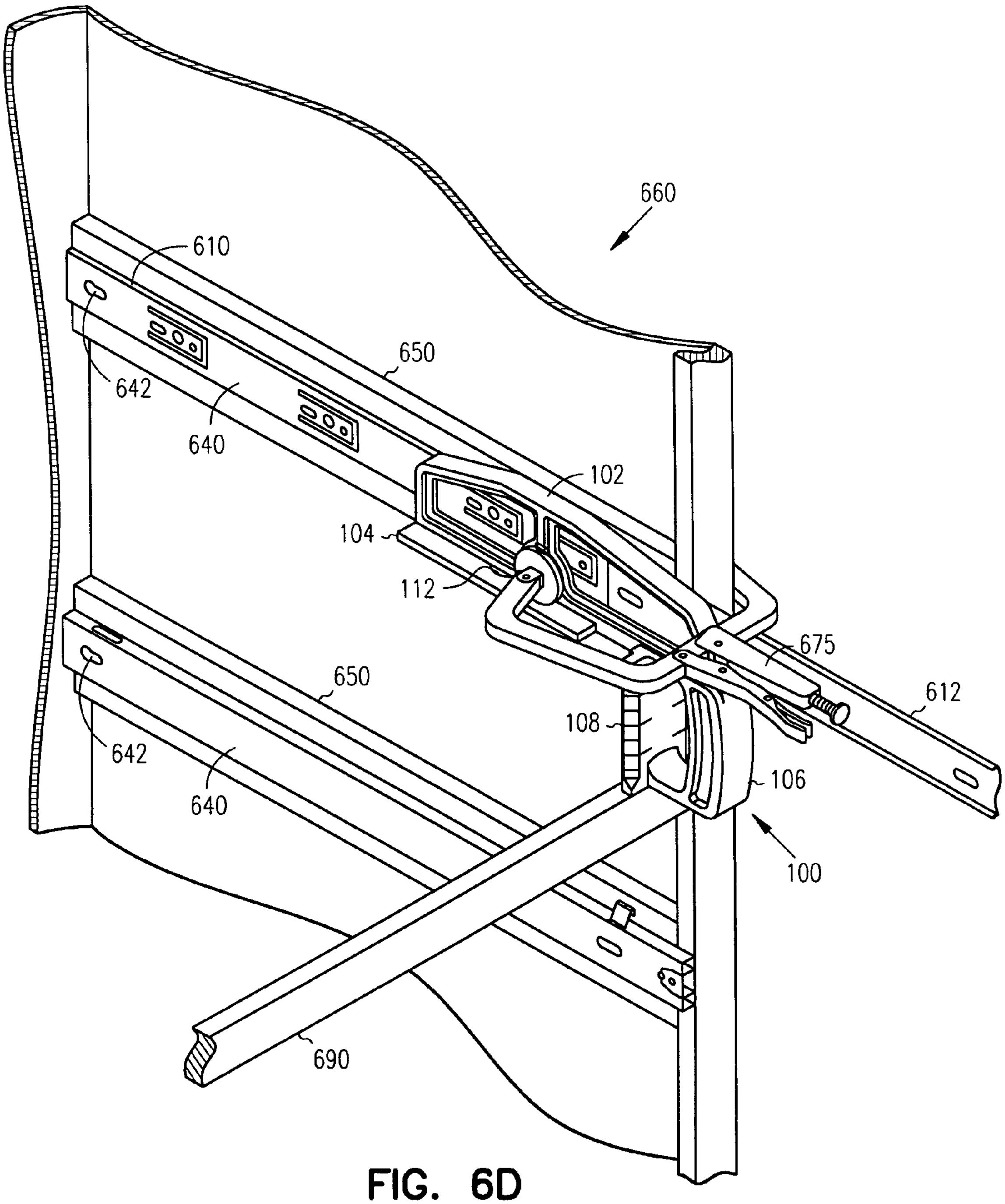
FIG. 6D is a perspective view of the tool and clamp of FIG. 6C showing the stationary component section of the full-extension slide being installed in an extended position in one embodiment of the present invention.

FIG. 6A is a perspective view of a magnetic mounting tool 100 magnetically coupled to a stationary component section 640 of a full-extension slide during installation of the stationary component section 640 (which, in this embodiment, includes a stationary portion 610 and extender 612 as shown in FIG. 6D) on its edge against a vertical surface in a structure having a front rail 690 located in a first position, together with a second installed stationary component section 640 of a second full-extension slide in one embodiment of the present invention. In this embodiment, the vertical surfaces are side rails 650, such as wood or metal rails, located on an interior side of a face-frame cabinet 660 having a front rail 690, although the invention is not so limited. Again, in other embodiments, the stationary component sections 640 are installed directly onto the stationery component, such as the interior side surface of the face-fame cabinet 660. It should be noted that full-extension slides can also be used on Euro-style cabinets having no front rail 690 and on virtually any other type of application described herein. In most instances, when installed on a vertical surface, a pair of stationary component sections 640 is installed at substantially the same height on either side of an opening in the cabinet interior. Multiple pairs of stationary component sections 640 can be installed at different heights for use with corresponding moving component sections (not shown), such as with a stack of two or more moving components, i.e., drawers, shelves or a combination thereof.

In most embodiments, it is advantageous to utilize a clamp to assist in securing the magnetic mounting tool 100 to the stationary component during installation of the stationary component section 650 although the invention is not so limited. The clamp can be secured in any desired manner as long as it performs the intended function. FIG. 6B is a perspective view of the magnetic mounting tool 100 and stationary component section 640 of the extension slide of FIG. 6A together with a clamp 675 in a first location in one embodiment of the present invention. Due to the location of the front rail 690 in relation to the magnetic mounting tool 100, in this embodiment it is possible to clamp the magnetic mounting tool 100 to the cabinet 660 along the front rail 690.

FIG. 6C is a perspective view of a magnetic mounting tool 100 magnetically coupled to a stationary component section 640 of an extension slide during installation on a vertical surface 650 in a structure having a front rail 690 located in a second position, together with a clamp 675 in a second location and a second installed stationary component section 640 of the extension slide in one embodiment of the present invention. Because the front rail 690 is further down as compared with FIGS. 6A and 6B, the magnetic mounting tool 100 is clamped to the cabinet 660 along the side rail 650. The spacing of the front rail 690 is generally dependent on the size of the cabinet 660 as well as on the size and hence the desired spacing of the moving component.

FIG. 6D is a perspective view of the magnetic slide mounting tool and clamp of FIG. 6C showing the stationary component section 640 of the extension slide being installed with the extender 612 in an extended position in one embodiment of the present invention. With the extender 612 in this position, the various screw holes 642 are now visible and accessible. The magnetic mounting tool 100 thus allows, for the first time, a user to not only magnetically couple a stationary component section 640 of virtually any type of slide to a stationary component, but provides a design that allows an extension slide to be extended while clamped to the stationary component 660, thus allowing a single user to align, clamp, extend and install a stationary component section of a slide without any outside assistance.

Figure 7:
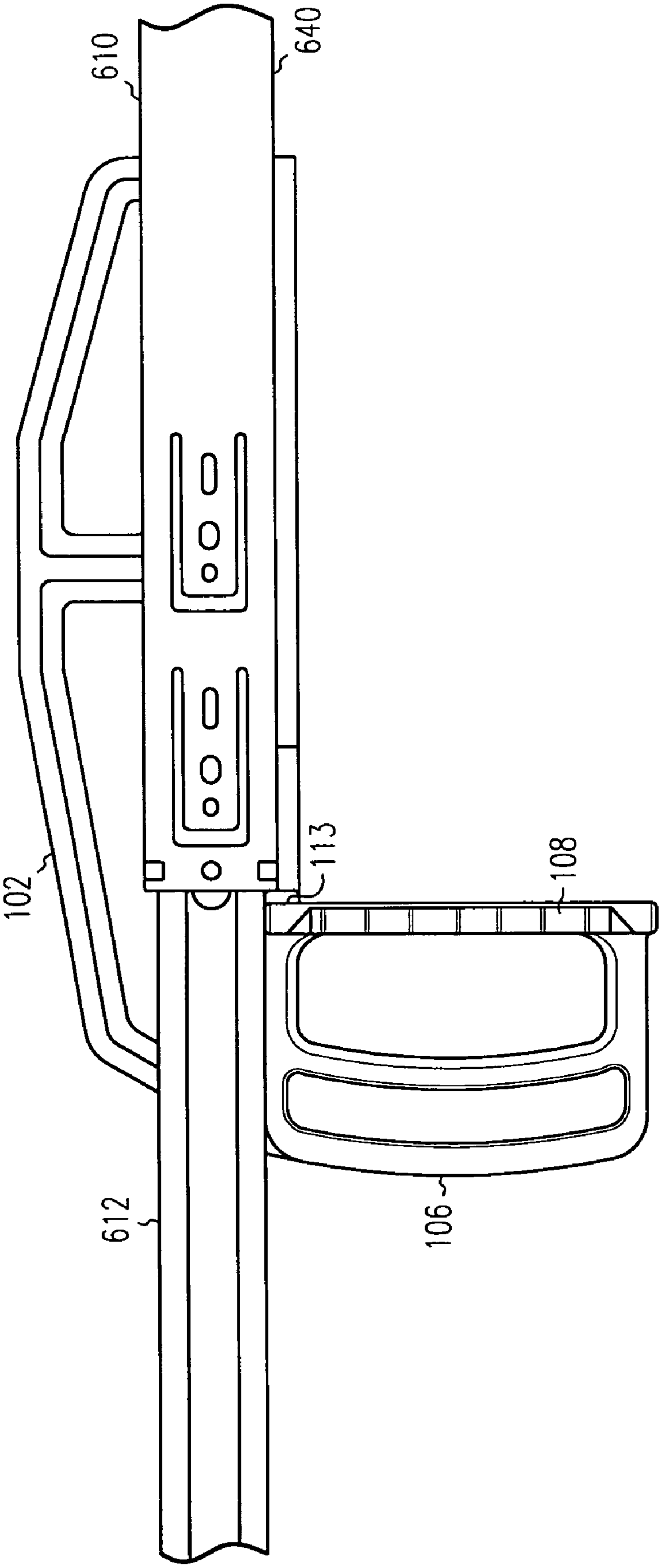
FIG. 7 is a side view of the sides of the tool and stationary component section of the full-extension slide shown in FIG. 6D that are closest to the stationary component and therefore not visible in FIG. 6D in one embodiment of the present invention.

FIG. 7 is a side view of the sides of the magnetic mounting tool 100 and stationary component section 640 of the full-extension slide shown in FIG. 6D which are closest to the stationary component 660 (shown in FIG. 6D) and therefore not visible from the perspective shown in FIG. 6D. As FIG. 7 shows, one additional advantage of having a lip 113 occurs when the extender 612 is in an extended position. Specifically, the lip 113 serves to provide a stop for the stationary portion 610, while allowing the extender 612 to slide between the magnetic mounting tool 100 and the stationary component (660). In this way, the stationary component section 640 can be installed away from the edge of the stationary component (660), yet there is no interference with the movement of the extender 612 even when the stationary component section 640 is clamped to the stationary component (660). In an alternative embodiment, the stationary component section 640 of the full-extension slide is aligned instead with a non-magnetic slide mounting tool clamped to the stationary component 660. Non-magnetic slide mounting tools (e.g., 1100A and 1100B) are described further herein and shown in FIGS. 11A-20.

As noted above, each stationary component section 640 has the extender 612 which is movable with a ball-bearing arrangement as is known in the art. These slides are extendable up to double their original length. Full-extension slides 640 can be relatively small and lightweight, i.e., about one (1) lb to ten (10) lbs (about 0.45 to 4.5 kg) up to very large, heavy slides weighing up to 50 lbs (22.7 kg) or more.

Figure 8:
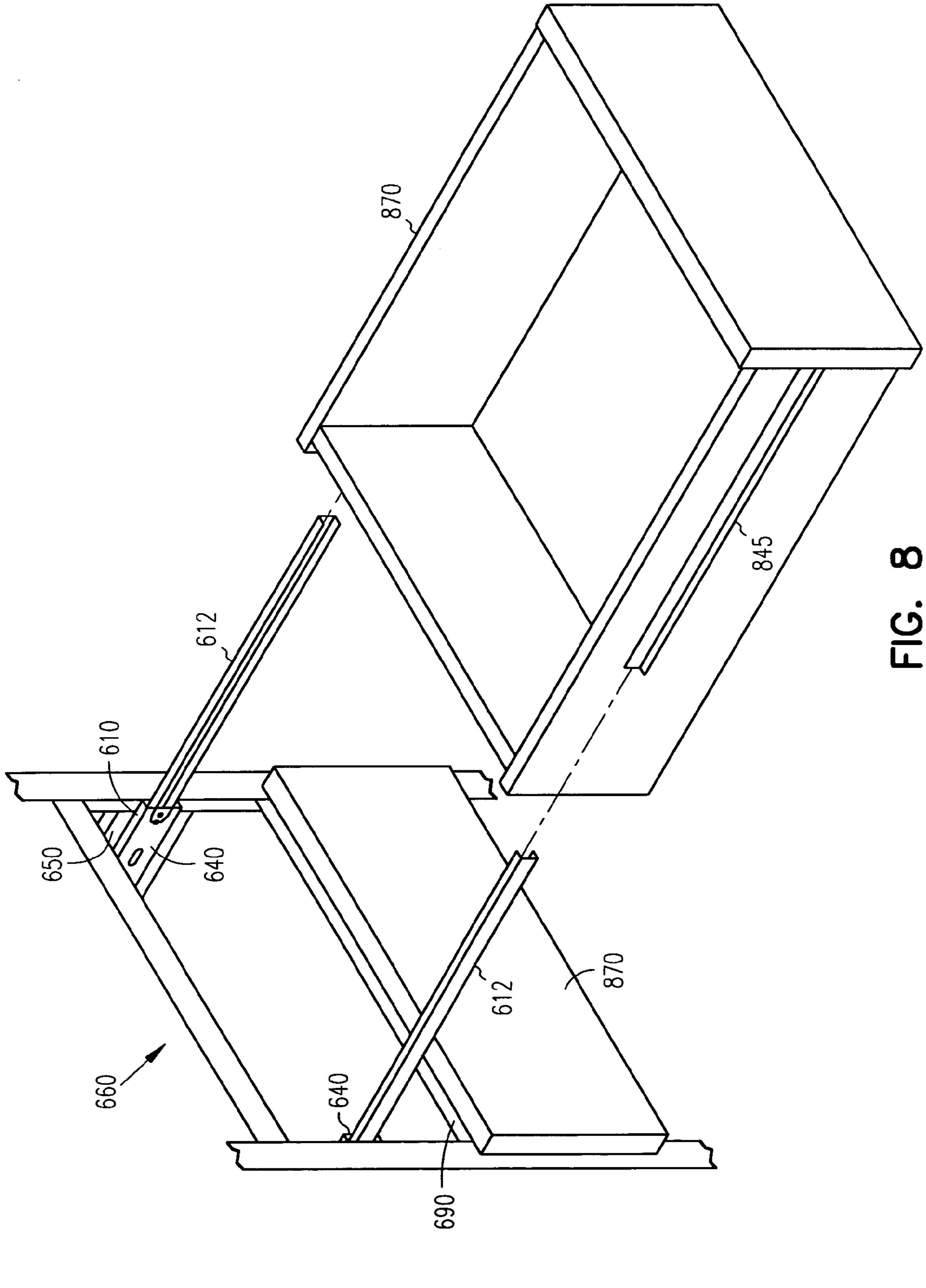
FIG. 8 is an exploded perspective view of a drawer assembly that utilizes two pair of full-extension slides in one embodiment of the present invention.

After installation, the stationary component section 640 of the full-extension slide is now properly positioned for use with a corresponding moving component section 845 installed on the side of a drawer, such as the drawers 870 shown in FIG. 8. In this embodiment, the extenders 612 are in an extended position and ready for engagement with the corresponding moving component section 845. The corresponding moving component section 845 is typically installed at about the mid-point of the drawer side, although the invention is not so limited. In one embodiment, the corresponding moving component section 845 is installed above or below the centerline of the drawer side. In one embodiment, the corresponding moving component section 845 is installed on a shelf side. In one embodiment, the moving component section 845 is installed with a non-magnetic slide mounting tool described herein. (See FIGS. 11A-20). Again, when installed on a vertical surface inside a large structure 860, the stationary component sections 640 are typically installed in pairs. In an alternative embodiment, a single stationary component section 640 is used together with a single moving component section 845, such as with a narrow shelf, for example. Multiple pairs of stationary component sections 640 can be installed as needed, such as for a stack of two or more moving components, such as drawers, shelves or a combination thereof.

In the embodiment shown in FIG. 8, a first pair of stationary component sections (not shown) is already in place and engaged with the corresponding moving component sections 845 of the drawer 870 shown in the closed position. A second pair of stationary component sections 640 is also already in place and ready for engagement with the corresponding moving component sections 845 (only one shown) installed on each of the outer side surfaces of the second drawer 870. A full-extension slide 640 is typically useful in heavier applications, such as for larger drawers or shelves expected to support weight in excess of about 100 lbs (45 kg).

Figure 9:
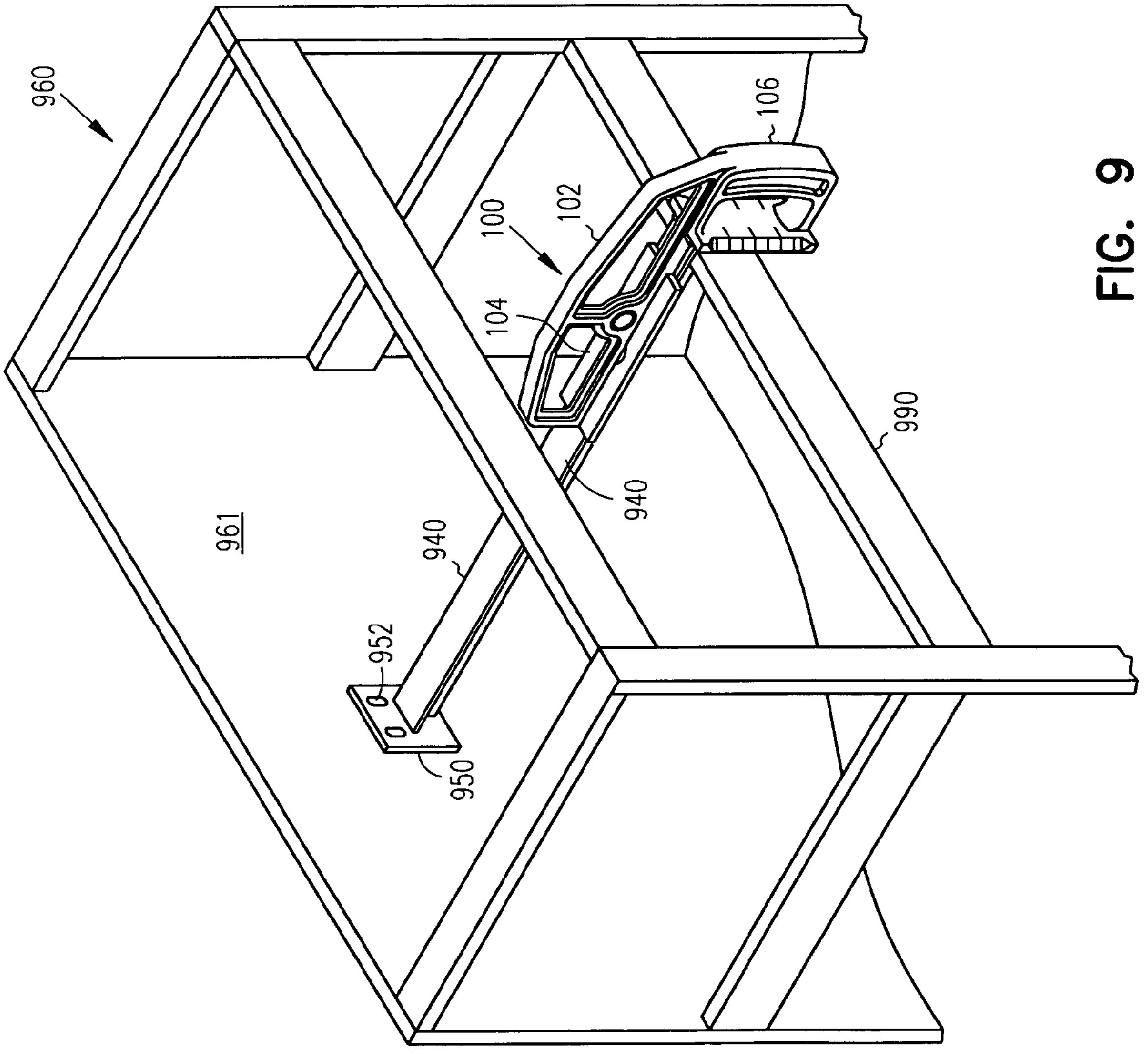
FIG. 9 is a perspective view of a magnetic slide mounting tool magnetically coupled to a stationary component section of a center bottom mount slide during installation of the stationary component section in one embodiment of the present invention.

The full-extension slide can also be used in a bottom center mounted installation. Additionally, specially-designed center bottom mount slides can also be used for bottom center mount installations. FIG. 9 is a perspective view of a magnetic slide mounting tool magnetically coupled to a stationary component section 940 of a specialized center bottom mount slide during installation of the stationary component section 940 in one embodiment of the present invention. In this particular embodiment, one end of the stationary component section 940 is secured to a front rail 990 and the other end is indirectly secured to a back surface 961, although the invention is not so limited. In some embodiments, the stationary component section 940 is installed along a solid, planar horizontal surface, such as the bottom surface of the interior of the stationary component or a center rail secured to the bottom surface. However, as noted above, in most embodiments, the stationary component section 940 in this type of installation is secured only at its ends. To aid in installation of the stationary component section 940 to the back (substantially vertical) surface 961 of the stationary component 960, a plastic socket 950 having socket screw holes 952 is used as is known in the art. The socket 950 is secured with the socket screw holes 952 to the back surface 961 and the stationary component section 940 is slipped into a slot in the socket 950.

As FIG. 9 shows, the stationary component section 940 is being installed at substantially the center point of the opening that houses the moving component. In this way only one slide is needed. Additionally, it is typically desirable with this type of installation, to install the stationary component section 940 up to the outer edge of the horizontal surface, such as the front rail 990 and/or the bottom surface of the stationary component 960 if no front rail 990 is present. The corresponding moving component (not shown), such as a drawer or shelf, has a moving component section installed by any means along the midline of its outer bottom surface, i.e., underneath. A center bottom mount installation, either with a slide designed specifically for such installations or any other type of slide has the advantage of requiring only one slide, thus making it cheaper. Additionally, for a given opening, it allows the moving component to be wider as compared with a moving component installed with side-mounted slides.

In operation, the magnetic mounting tool 100 is grasped by either the upper handle 102 or lower handle 106 and magnetically coupled to a slide, such as the stationary component portion of the Euro slide 440 shown in FIG. 4 or of the bottom mount slide, the full-extension slide 640 shown in FIG. 6 (side-mount installation) or the center bottom mount slide 940 shown in FIG. 9 (center-mount installation). With respect to the side-mount installations of either the stationary component sections of the Euro slide or the bottom mount slide (not shown), the stationary component section is magnetically coupled on its edge and can further be adjusted along the top surface 105 of the horizontal component 104, if necessary, until it is oriented properly with respect to the magnetic mounting tool 100. Proper orientation typically occurs when at least the enlarged end extends beyond the horizontal component 104 of the magnetic mounting tool 100 such that the flat surface of the stationary component section is flush against the top surface 105 of the horizontal component 104. The full-extension slide 640 can essentially be placed anywhere along the top surface 105 of the horizontal component 104 for such installations. The stationary component section is then placed against the desired vertical surface and aligned as desired by moving the magnetic mounting tool 100 up or down.

If desired, the markings 302 on the lower handle 106 can be used to properly align the stationary component section on the vertical surface as described herein. If desired, additional clamping means can be used to secure the stationary component section of any type of slide against the vertical surface as described herein. A sufficient number of fasteners, such as screws can then be secured in the holes located on the stationary component section of the slide, in order to properly secure this section to the vertical surface. In most embodiments, the fastener holes located in the area of the magnetic mounting tool 100 are also visible and accessible while the slide is magnetically coupled to the magnetic mounting tool 100, such that fasteners can be inserted in this section of the slide as well. Additionally, with the full-extension slide, fastener holes can be made visible by extending the extendable portion of the stationary component, even while the stationary component section is coupled to the magnetic mounting tool 100 and in contact with the vertical surface. In this way, virtually any type, size or brand of bottom mount slide or extension slide designed for installation on a vertical surface, including the full-extension slide and Euro slide, can be properly aligned and installed on a vertical surface by one person.

With regard to installation of a stationary component section 940 of a center bottom mount slide as shown in FIG. 9, in operation, the magnetic mounting tool 100 is grasped as described above by either the upper handle 102 or lower handle 106 and magnetically coupled to the stationary component section 940. In this embodiment, the stationary component section 940 is magnetically coupled in a flat position to the bottom surface 107 of the horizontal component 104. More specifically, the top surface of the stationary component section 940 is magnetically coupled to the bottom surface 107 of the horizontal component 104. If necessary, the stationary component section 940 is adjusted along the horizontal component 104 until the end of the stationary component section 940 abuts the front surface 109 of the vertical component 108 in ensure the stationary component section 940 is square with the surface it is being installed on. The stationary component section 940 is then placed proximate to the desired surface and aligned horizontally, as desired, by moving the magnetic mounting tool 100 sideways, i.e., left or right. If desired, additional clamping means can be used to secure the slide 440 against the surface.

Figure 10:
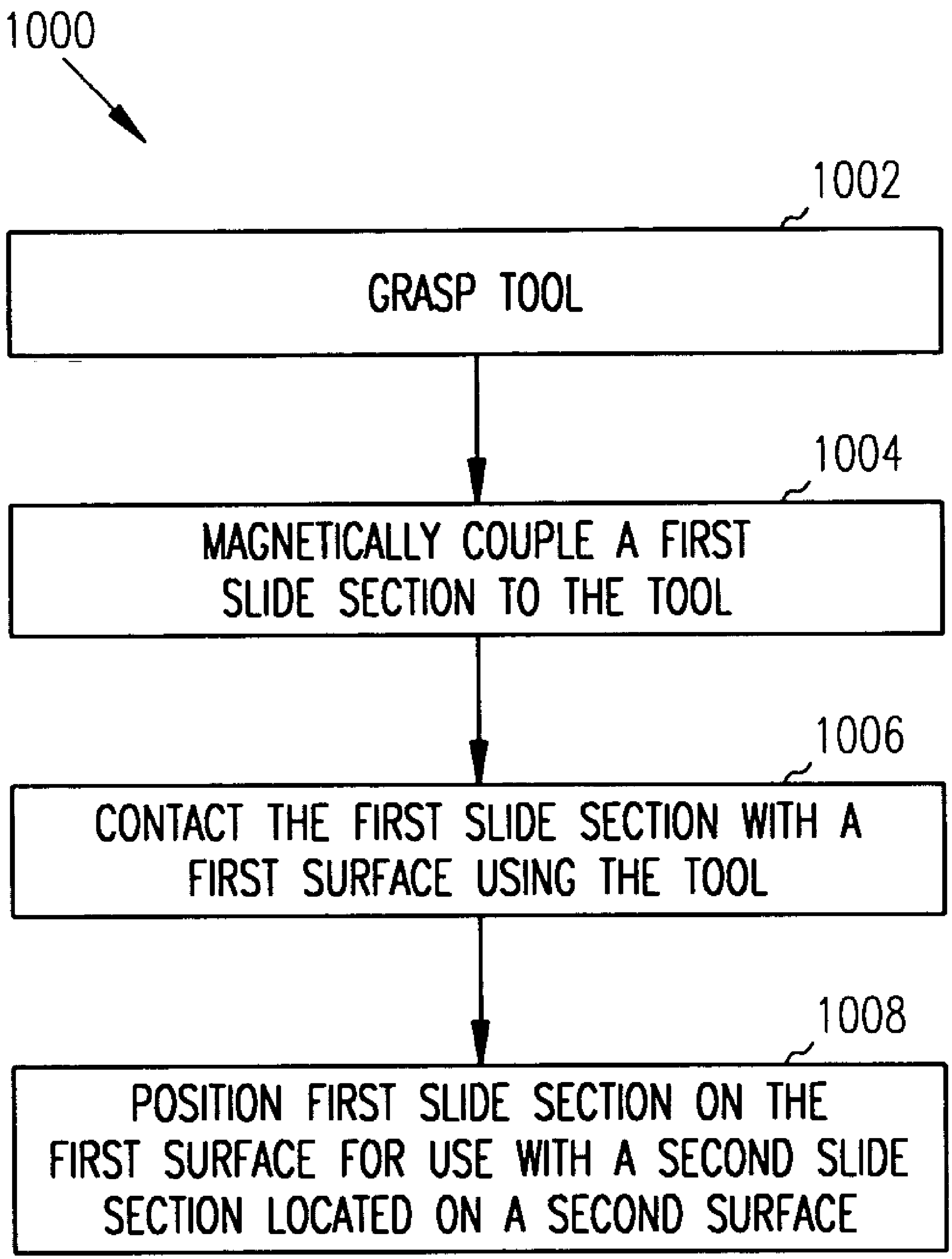
FIG. 10 is a block diagram of a method of using a magnetic slide mounting tool in one embodiment of the present invention.

In one embodiment, the invention further comprises a method for installing slides on a surface as shown in FIG. 10. The method 1000 comprises grasping 1002 a tool, magnetically coupling 1004 a first slide section to the tool, contacting 1006 the first slide section with a first surface using the tool; and positioning 1008 the first slide section on the first surface for use with a second slide section on a second surface. In one embodiment, the method further comprises securing 1010 the first slide section to the first surface. In one embodiment, the first slide section is a stationary component section and the second slide section is a moving component slide section.

In one embodiment, the present invention additionally or alternatively comprises one or more non-magnetic slide mounting tools (hereinafter "non-magnetic mounting tool"), which can also be referred to as "mounting brackets." The one or more non-magnetic mounting tools can be used to align and install one or more moving component sections of any slide which is not bottom-mounted. Such "non bottom-mounted" slides shall be referred to hereinafter as "center-mounted slides" although it is understood that this can include slides that are mounted above or below the center-line, although not along a top edge or a bottom edge of a moving component. Such "center-mounted slides" include, but are not limited to, full-extension slides, partial-extension slides, and the like. The one or more non-magnetic mounting tools can additionally or alternatively be used to align and install the stationary component section of any type of slide having a substantially flat surface. In one embodiment, the one or more non-magnetic mounting tools are modified to accommodate stationary component sections of bottom-mount slides.

Figure 11A:
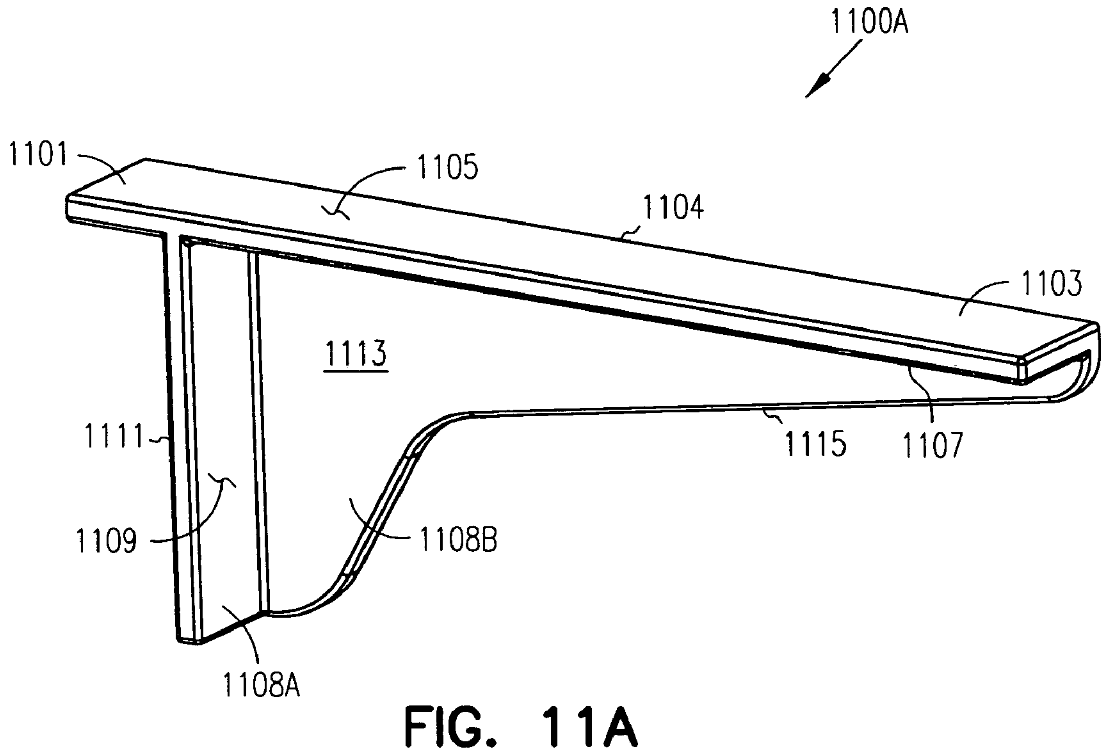
FIGS. 11A and 11B are perspective views of a pair of non-magnetic slide mounting tools, i.e., a left-sided tool and a right-sided tool, in one embodiment of the present invention.
Figure 11B:
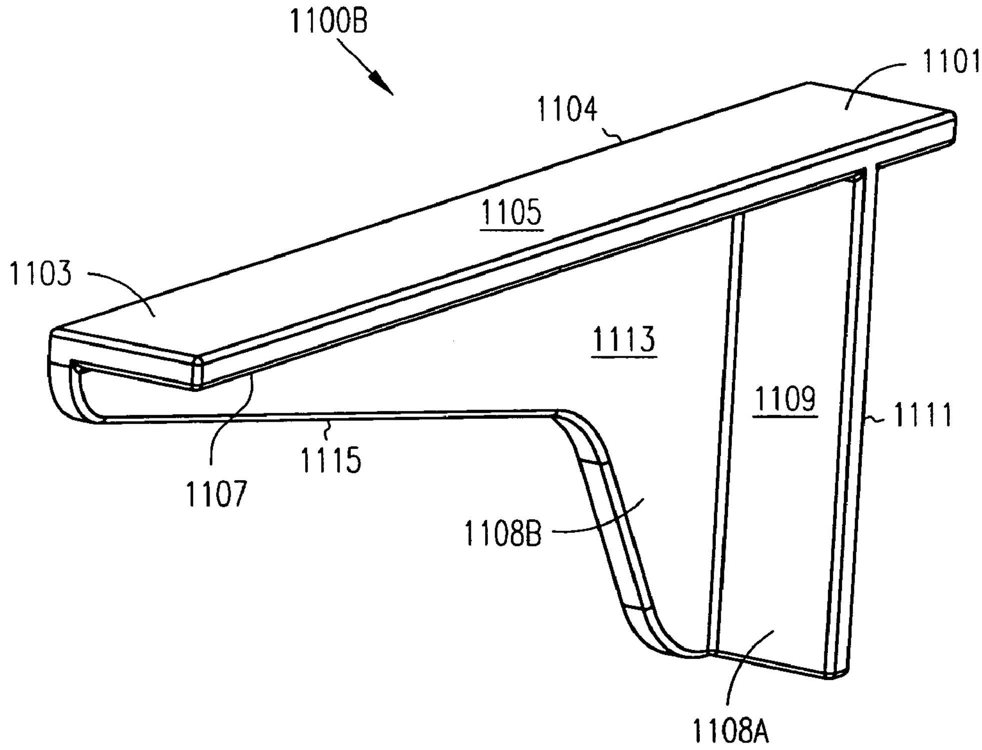

As shown in FIGS. 11A and 11B, the non-magnetic mounting tools 1100A and 1100B comprise, in one embodiment, a pair of non-magnetic mounting tools designed for use on a corresponding side of a stationary component when clamped in an outwardly facing position. Specifically, FIG. 11A shows a right-sided non-magnetic mounting tool 1100A for clamping to a right side of a stationary component in an outwardly-facing position and FIG. 11B shows a left-sided non-magnetic mounting tool 1100B for clamping to a left side of a stationary component in an outwardly-facing position. The left-sided and right-sided non-magnetic mounting tools, 1100A and 1100B, respectively, are mirror images of one another. In one embodiment, the words "RIGHT" and "LEFT" are stamped on the appropriate non-magnetic mounting tool. As will be discussed further herein and shown in FIGS. 17-20, the non-magnetic mounting tools 1100A and 1100B can also be used on the opposing side of a stationary component when clamped in an inwardly-facing position. In these embodiments, the right-sided non-magnetic mounting tool 1100A is clamped to a left side of a stationary component and the left-sided non-magnetic mounting tool 1100B is clamped to a right side of the stationary component. When in this position, the non-magnetic mounting tools 1100A and 1100B can be used either to align a stationary component section of any type of slide or to align a moving component section of any center-mounted slide (See, for example, FIGS. 17 and 18).

The non-magnetic mounting tools 1100A and 1100B are each comprised of a substantially horizontal planar surface (hereinafter "horizontal component") 1104, a first substantially vertical planar surface (hereinafter "first vertical component") 1108A connected thereto and a second substantially vertical planar surface (hereinafter "second vertical component") 1108B perpendicular to the first vertical component 1108A. The horizontal component 1104 includes a tab portion 1101 which extends beyond the first vertical component 1108A in one direction and a support portion 1103 which extends beyond the first vertical component 1108A in the opposing direction, and which is connected to the second vertical component 1108B. The horizontal component 1104 further has a top surface 1105 and a bottom surface 1107. The first vertical component 1108A has a first front surface 1109 and a first back surface 1111. The second vertical component 1108B has a first side surface 1113 and a second side surface 1115. In one embodiment, all of the above components are integral with each other, being made from a single piece of material. In another embodiment, all of the components are integral except for a hatched section (1228) shown in FIGS. 12A and 12B which is manufactured separately and later secured to the remaining portion of the non-magnetic mounting tool 1100A or 1100B. In other embodiments, only some or none of the components are integral and the remaining component are joined together by any means known in the art.

Each non-magnetic mounting tool 1100A and 1100B can be any suitable size and shape as long as it can perform the intended function. However, the pair of non-magnetic mounting tools 1100A and 1100B do not necessarily need to be the same size and shape. Preferably, the non-magnetic mounting tools 1100A and 1100B are designed to allow for proper clamping by the user during installation of either stationary or moving component slide sections. The non-magnetic mounting tools 1100A and 1100B are designed to allow a moving component to balance on top of two such tools clamped to either side of an opening in a stationary component. Preferably, the non-magnetic mounting tools 1100A and 1100B are also designed to allow for stationary component sections of slides having substantially flat bottoms to rest on top during installation of the stationary component section. In one embodiment, the non-magnetic mounting tools 1100A and 1100B are designed to accommodate the lip of a stationary component section of a bottom mount slide. In one embodiment, one or more of the non-magnetic mounting tools 1100A and 1100B contain a suitable gap for accommodating such a lip.

In one embodiment the length of the non-magnetic mounting tools, 1100A and 1100B, which essentially comprises the length of the horizontal component 1104 (i.e., the tab portion 1101 and the support portion 1103) is between about six (6) to 12 in or more (about 15.2 to 30.5 cm), depending on the length of the stationary component section being installed. For installation of a stationary component section of a bottom mount slide, the non-magnetic mounting tools 1100A and 1100B may be up to 20 inches in length. In a particular embodiment, the non-magnetic mounting tools 1100A and 1100B are used with stationary component sections that do not exceed about ten (10) in (about 25.4 cm) in length such that the maximum length of the non-magnetic mounting tools 1100A and 1100B are about 11.5 in (about 29.2 cm). In one embodiment, each non-magnetic mounting tool 1100A and 1100B has an overall maximum height of between about three (3) and seven (7) in (about 7.6 and 17.8 cm), i.e., the height of the first vertical component 1108A and thickness of the horizontal component 1104 combined (or otherwise the maximum height of the second vertical component 1108B).

If the first and second vertical components, 1108A and 1108B, respectively, are too tall in height, the usefulness of the non-magnetic mounting tool in smaller stationary component sections will be limited. If they are too small, the tool will not provide sufficient support for the user during use. Additionally, the width of the first vertical component 1108A and the length of the second vertical component 1108B should each be sized to accommodate a clamp to provide a secure connection to the stationary component section during installation of the particular slide portion being installed. In one embodiment, the first vertical portion 1108A has a width of at least about 0.75 in up to about two (2) in or more. In one embodiment, the first vertical portion 1108A has a height of about two (2) to six (6) in.

In most embodiments, the maximum height of the second vertical portion 1108B is substantially the same as the height of the first vertical portion 1108A, although the invention is not so limited. In the embodiments shown in FIGS. 11A-11B and FIGS. 12A-12B, the second vertical portion 1108B has a curved shape, with the maximum height occurring at the intersection with the first vertical portion 1108A. Again, the invention is not so limited and the second vertical portion 1108B can be any suitable shape and size as long as it can perform the intended function. In one embodiment, the second vertical portion 1108B is substantially rectangular. However, in most embodiments the curved design for the second vertical component 1108B is preferable as it minimizes material usage. In the embodiment shown in the figures, e.g., FIGS. 11A and 11B, the height of the second vertical portion 1108B becomes gradually smaller, tapering to a height of between about 0.25 and one (1) in at the end opposite the first vertical component 1108A. Although in most embodiments the second vertical component 1108B is about the same length as the horizontal component 1104, the invention is not so limited and either component can be longer, as desired, as long as adequate support is provided.

Figure 12A:
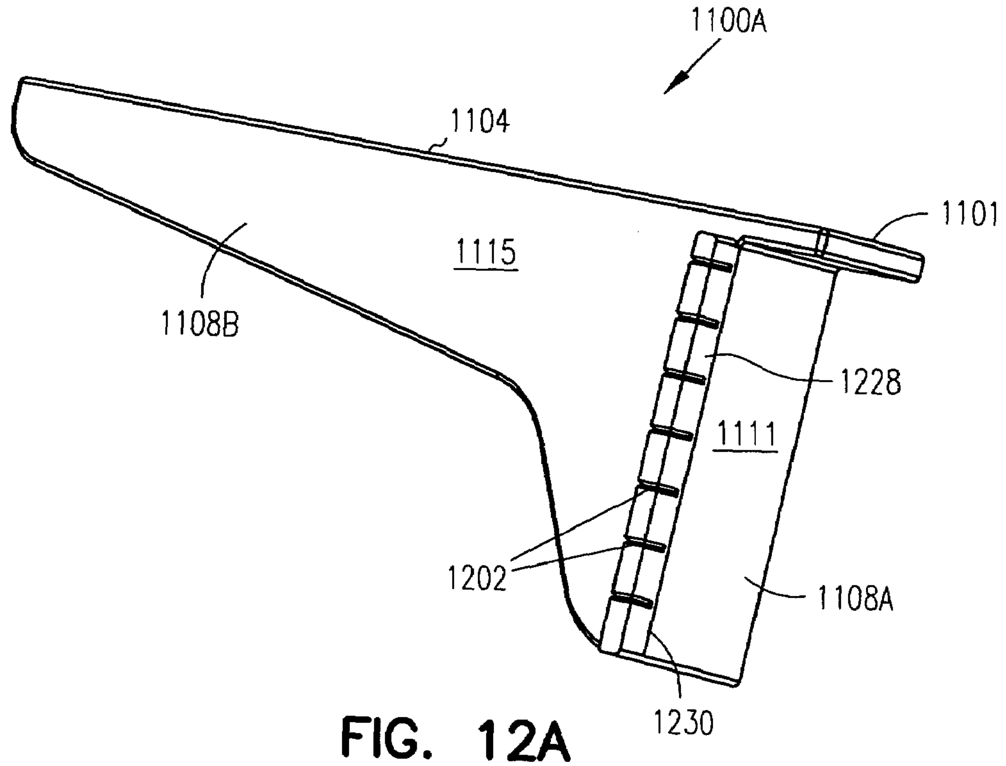
FIGS. 12A and 12B are perspective views from another angle of the pair of non-magnetic slide mounting tools in FIGS. 11A and 11B in one embodiment of the present invention.
Figure 12B:
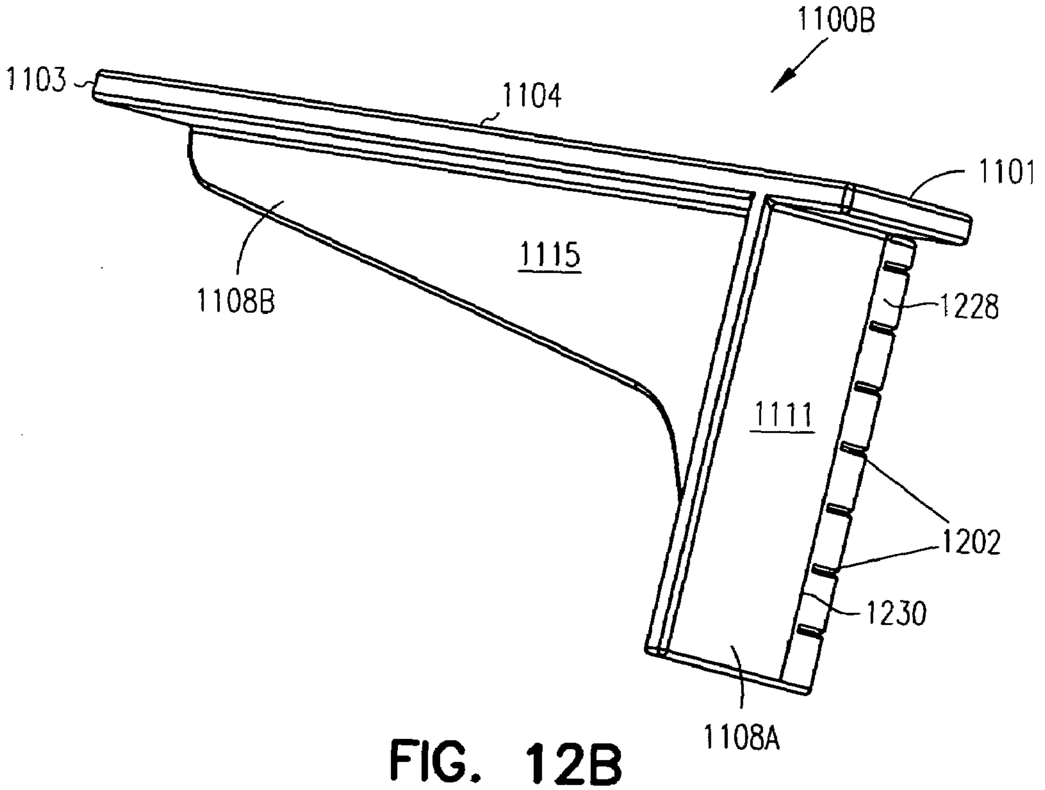
Figure 13:
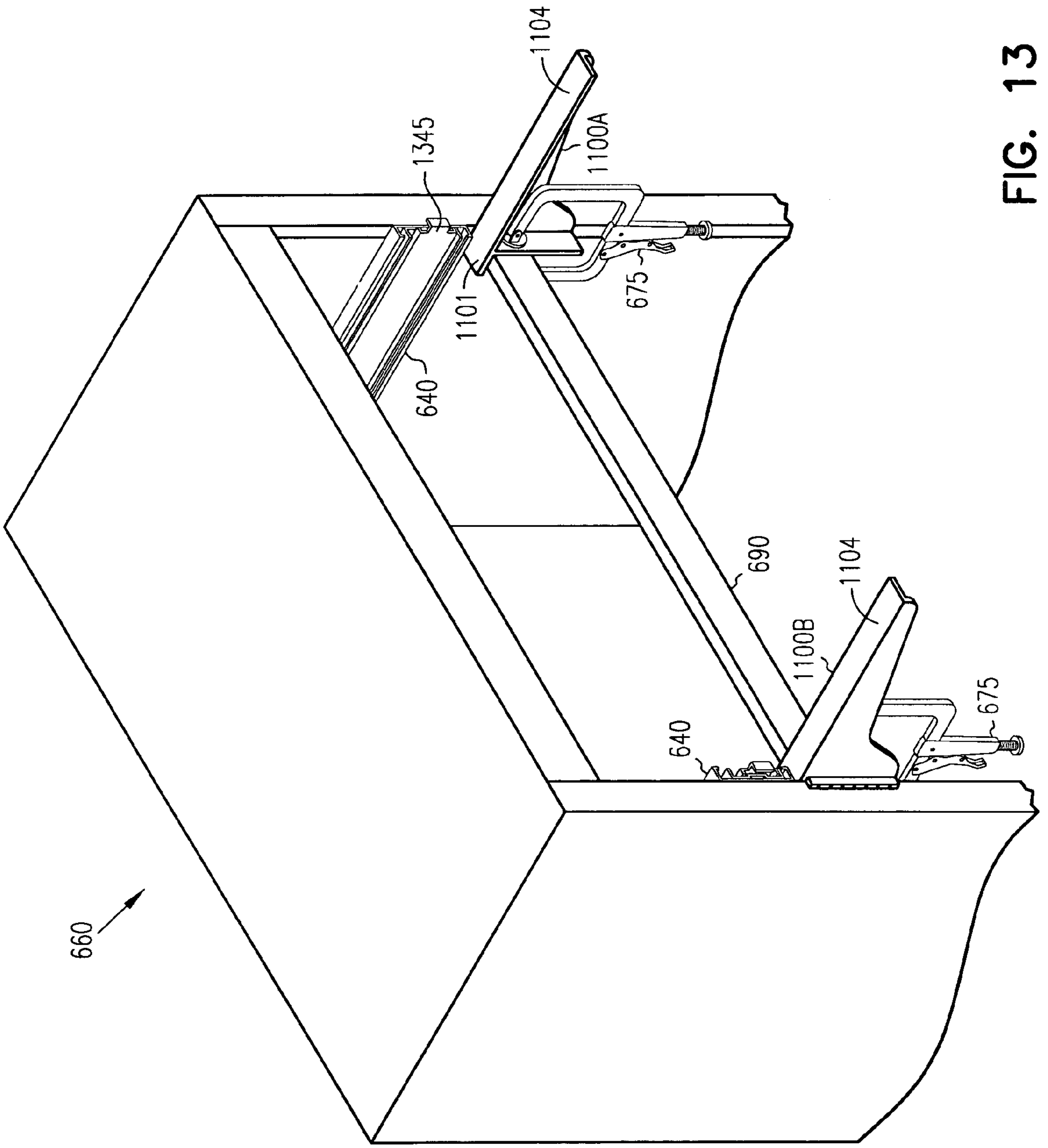
FIG. 13 is a perspective view of the left-sided and right-sided non-magnetic slide mounting tools each clamped to a front rail of a stationary component on their respective sides in outwardly-facing positions after the installation of stationary component sections of full-extension slides on the left side and the right side of the stationary component and with a moving component section inserted into each of the stationary component sections in one embodiment of the present invention.

In one embodiment, as shown in FIGS. 12A and 12B, the back surface 1111 and/or front surface 1109 and/or one or both side surfaces of the first vertical component 1108A can also be provided with hatch marks 1202. In the embodiment shown in FIGS. 12A and 12B, the hatch marks 1202 are on the edge closest to the second vertical section 1108B and extend beyond the intersection of the first vertical component 1100A and second vertical component 1100B as shown.

The hatch marks 1202 are used to assist in aligning a slide (or a pair of slides) against a substantially vertical surface. For example, if a drawer needs to be placed at a certain height, appropriate measurement lines can be marked on the vertical surface of the stationary component, corresponding with the desired height of the stationary component section of the slide being installed. The hatch marks 1202 present on the front surface 1113 of the first vertical section 1108A are visible when the non-magnetic mounting tool 11008A or 11008B is clamped in an outwardly-facing position on its respective side of the stationary component (e.g., left-sided non-magnetic mounting tool 1108B is clamped to the left side of the stationary component). The hatch marks 1202 present on the back surface 1111 of the first vertical section 1108A are visible when the non-magnetic mounting tool 1108A or 1108B is clamped in an inwardly-facing position on the reverse side of the stationary component (e.g., when the left-sided non-magnetic mounting tool 1108B is clamped to the right side of the stationary component). For clarity in reading the hatch marks 1202, each mark can be alternately long and short, although the invention is not so limited. Typically such hatch marks 1202 are about 0.5 in (1.3 cm) apart, although any distance can be provided for the convenience of the user. In one embodiment, the hatch marks 1202 are contained in a hatch mark section 1228 and joined to the first vertical section 1108A at a seam 1230 as shown, although this section 1128 can still be considered a part of the first vertical section 1108A.

Referring again to FIGS. 11A and 11B, the top surface 1105 of the horizontal component 1104 is designed to support (together with a second top surface 1105 on a second tool), a moving component (e.g., drawer, shelf) which is having a moving component section aligned and installed onto its outer surface(s), or otherwise support a stationary component section of a slide. Preferably the width of the top surface 1105 is sufficient to support any type of slide being installed. In one embodiment, the width of the top surface 1105 is at least as wide as the width of the slide being installed. In most embodiments, the width of the top surface 1105 is at least about 25% up to about 150% the width of the slide being installed. If the horizontal component 1104 is too wide in comparison with the slide being installed, it will make the respective non-magnetic mounting tool 1100A or 1100B more difficult to use. In a particular embodiment, the width of the top surface 1105 is between about 0.4 and one (1) in (one (1) and 2.5 cm).

Preferably the length of the horizontal component 104 is of a dimension that provides adequate support for the component being installed, i.e., the moving component itself or the stationary component section of a slide.

The horizontal component 1104 need only be as thick as required to perform its intended function and preferably does not flex during use. In one embodiment, the horizontal component 1104 has a minimum thickness of between about 0.13 and 0.5 in (about 0.3 and 1.3 cm). In most embodiments, the horizontal component 1104 is less than about 0.25 inches and the stationary component section 640 of a slide is installed at least about 0.25 inches above a front rail 690 as described above in FIG. 13.

The tab portion 1101 of the horizontal component 1104 is preferably sufficiently long to be used as a support tab over a face frame rail. In one embodiment, the tab portion 1101, i.e., the portion of the horizontal component 1104 which extends beyond the first vertical component 1108A, is between about 0.5 and three (3) inches in length. In one embodiment, the tab portion 1101 is about 0.75 to 1.25 inches in length.

The first vertical component 1108A can also be of any sufficient size and shape as long as it can perform its intended function. In most embodiments the first vertical component 1108A is wider than the horizontal component 1104 to accommodate a hatch section 1228 as shown in FIGS. 12A and 12B. In one embodiment, the width of the first vertical component 1108A is at least 10% wider up to 20% wider than the horizontal component 1104. In one embodiment, the width of the first vertical component 1108A is between about 0.5 in and four (4) in (about 1.3 and 10.2 cm). In a particular embodiment, the width of the first vertical component 1108A is between about one (1) and 1.5 and 2.5 in (5.1 and 6.35 cm).

The non-magnetic mounting tools 1108A and 1108B can be made of any suitable material able to perform the intended function. In one embodiment the non-magnetic mounting tools 1108A and 1108B are made of wood, wood composites, any type of plastic (e.g., nylon, polyethylene, polystyrene, and so forth), any type of magnetic metal or metal alloy (e.g., steels), nonmagnetic metal alloy (e.g., aluminum, aluminum alloys), and so forth. In one embodiment 6063-T5 aluminum alloy is used. In another embodiment, a glass-filled, type 66 nylon is used. Use of plastic non-magnetic mounting tools 1108A and 1108B may also provide a more rigid holding device as compared with certain types of conventional aluminum devices.

As with the magnetic mounting tool 100 described above, the non-magnetic mounting tools 1108A and 1108B can be made using any suitable process, such as extrusion, injection molding, casting, and so forth.

FIGS. 13-16 provide views of one embodiment of a step-by-step process for installing a moving component section of a center-mounted slide onto a moving component. In this embodiment, the center-mounted slide is a full-extension slide 640 as described above, although the invention is not so limited as described herein. In one embodiment, the stationary component sections 640 of the full-extension slides have been installed by any means known in the art in a stationary component 660 having a front rail 690. In one embodiment, one or both of the stationary component sections 640 have been installed using the magnetic mounting tool 100 described above and shown in the various figures, such as in FIGS. 6A-6D. The stationary component sections 640 should be positioned a sufficient distance above the rail 690 to allow the non-magnetic mounting tools 1100A and 1100B to be inserted between the top surface of the rail 690 and the bottom of the stationary component sections 640. In one embodiment the stationary component sections 640 are each about 0.25 in above the top of the rail 690, although the invention is not so limited.

Once the stationary component section 640 is installed, a moving component section 1345 can be inserted into or engaged with the stationary component section 640 in preparation for installation of the moving component section 1345 onto a moving component. In the embodiment shown in FIG. 13, the non-magnetic mounting tools 1100A and 1100B are then placed into the opening of the stationary component 660 with the support portion 1103 facing outwardly so that the tab portions 1101 rest on top of the front rail 690 and under the stationary component section 640 as shown. The non-magnetic mounting tools 1100A and 1100B are then clamped to the rail 690 with suitable clamps 675 to hold them in position.

Figure 14:
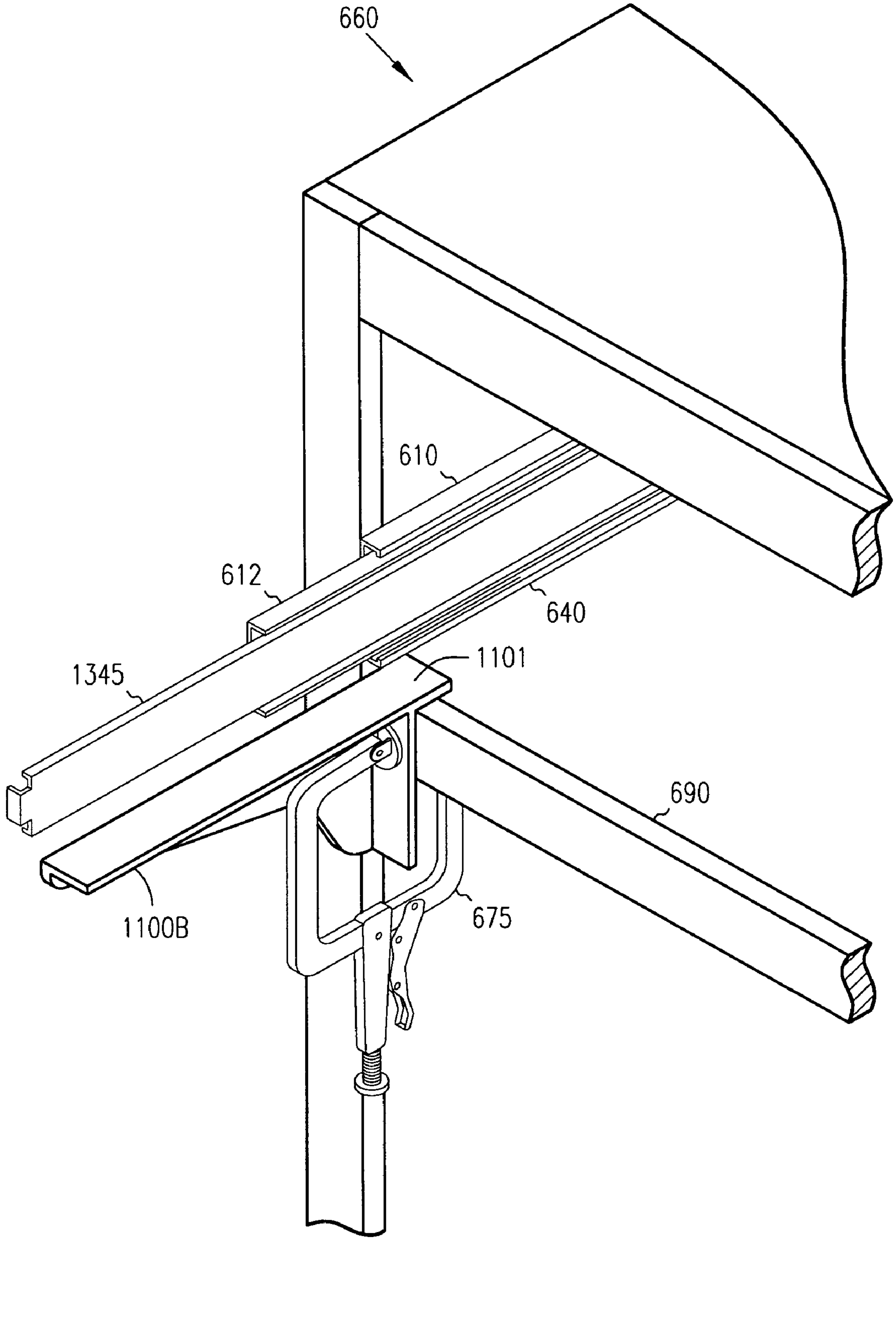
FIG. 14 is a perspective view of the left-sided tool of FIG. 13 and left fill-extension slide of FIG. 13 with the left moving component section in an extended position in one embodiment of the present invention.
Figure 15:
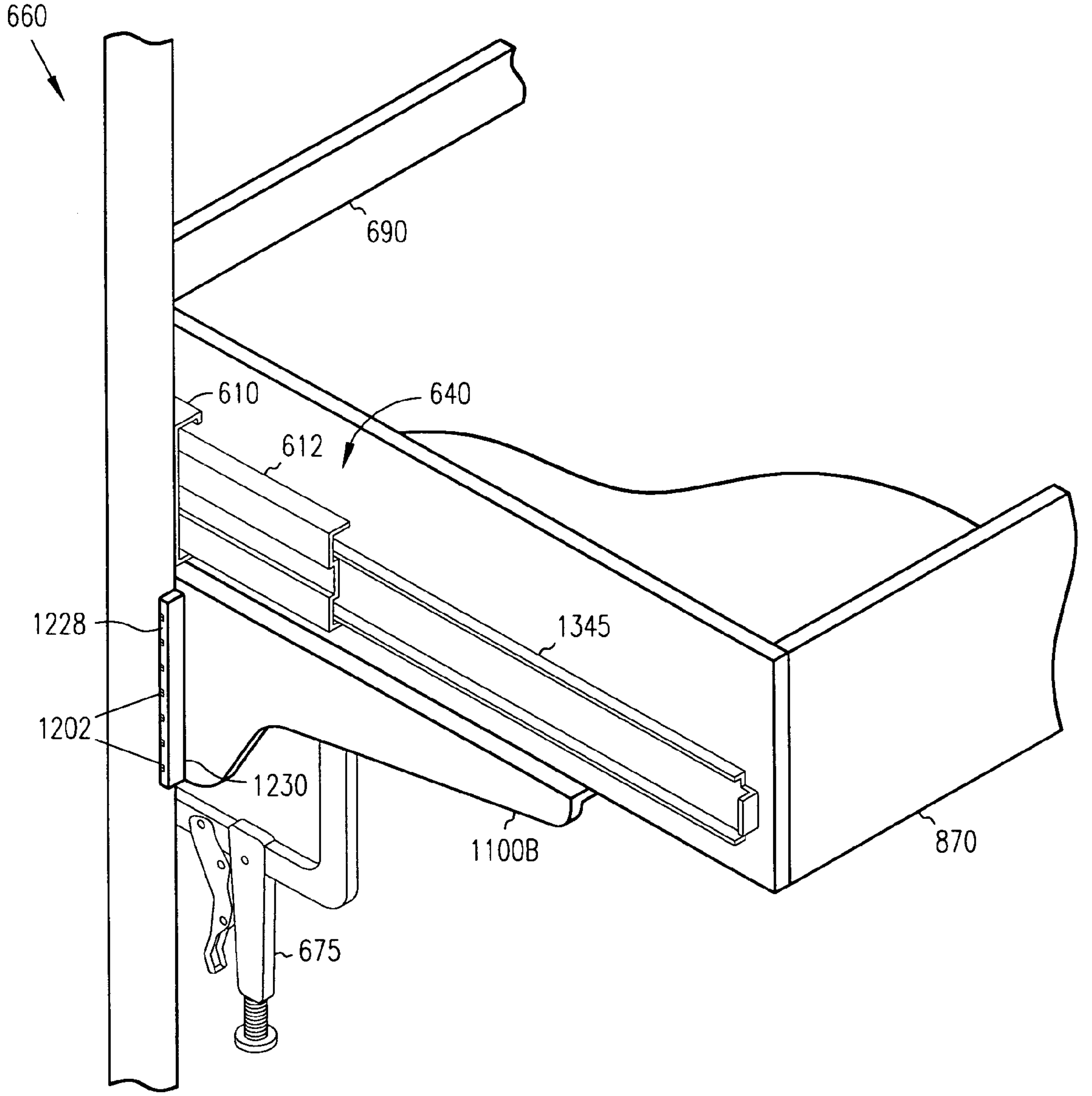
FIG. 15 is a perspective view of the left-sided tool of FIG. 13 and left full-extension slide of FIG. 13 with a drawer balanced on the left-sided tool and right-sided tool (not shown), with the left moving component section of the slide in contact with the drawer in one embodiment of the present invention.

The moving component section 1345 can then be extended as shown in FIG. 14. In this embodiment, the extenders 612 (which are part of the stationary component section 640) also move out a short distance beyond the front of the stationary component 660 as shown. The embodiment shown in FIG. 14 is a perspective view of the left-sided non-magnetic mounting tool 1100B clamped to the left side of a stationary component 660 with the moving component section 1345 extended as shown. In one embodiment, the moving component section 1345 is extended approximately eight (8) to twelve (12) in from the front of the stationary component 640. In a particular embodiment, each moving component section 1345 is extended to a distance of about ten (10) in from the front of the stationary component 660.

Figure 16:
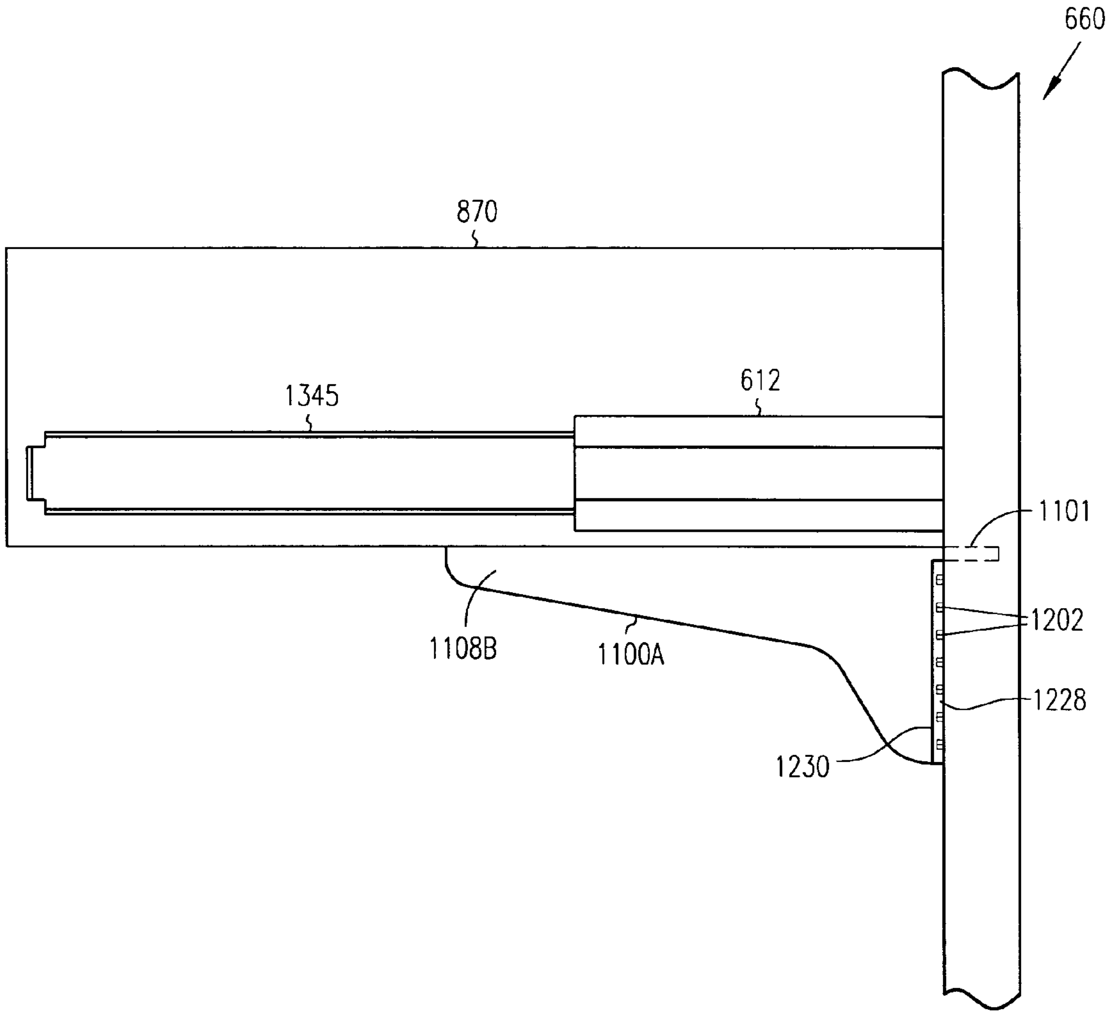
FIG. 16 is a perspective view of the right-sided tool of FIG. 13 and full-extension slide with a drawer balanced on the right-sided tool and left-sided tool (not shown), with the right moving component section of the slide in contact with the drawer in one embodiment of the present invention.

A moving component such as a drawer or shelf can then be balanced on the left-sided and right sided non-magnetic mounting tools, 1100A and 1100B, respectively. In the embodiment shown in FIG. 15 a drawer 870 is balanced on the left-sided non-magnetic mounting tool 1100B and right-sided non-magnetic mounting tool 1100A (not shown). FIG. 16 shows the position of the drawer 870 when balanced on the right-sided non-magnetic mounting tool 1100A. The moving component section 1345 can now be installed onto the drawer 870 and located at any suitable distance back from the front of the drawer 870. In one embodiment, the moving component section 1345 is installed about 0.06 to 0.5 in back. In a particular embodiment, the moving component section 1345 is installed about 0.125 in back from the front face of the drawer 870. Fasteners can then be installed to secure the moving component section 1345 to the drawer 870. In one embodiment, the fasteners are screws. In one embodiment, the user installs a first fastener at the more forward end of the moving component section 1345 and continues adding fasteners in sequence towards the more rearward end until the moving component section 1345 is completely installed on the drawer 870, although the invention is not so limited. The user can install fasteners in any manner desirable.

The process is repeated on the other side of the drawer 870. At this point the moving component sections 1345 are properly installed on both side of the drawer 870 for proper engagement with the stationary component sections 640, and the non-magnetic mounting tools 1100A and 1100B can be removed.

Figure 17:
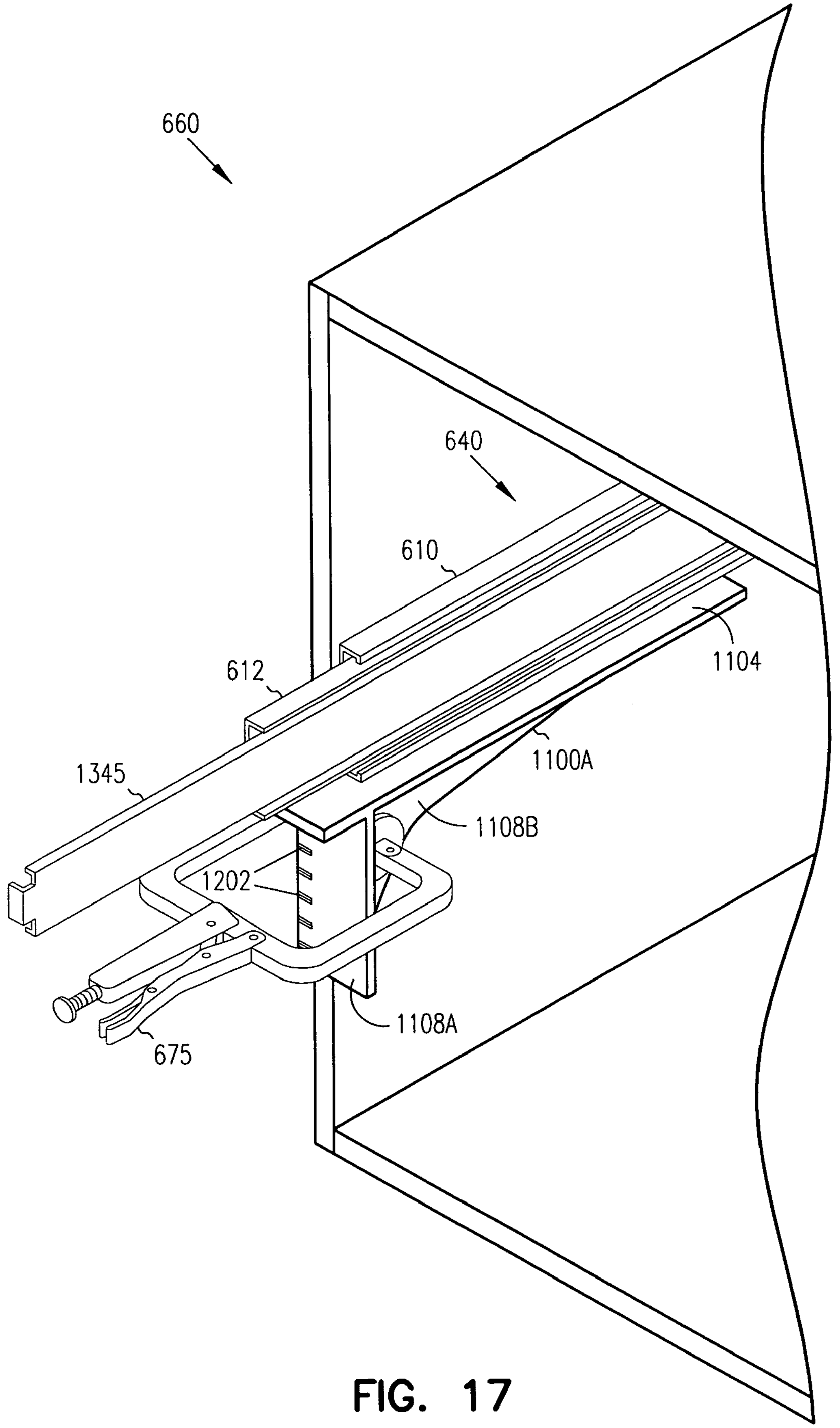
FIG. 17 is a perspective view of a non-magnetic right-sided slide mounting tool clamped to a left side of a frameless stationary component in an inwardly-facing position during or after alignment and installation of a stationary component section of a full-extension slide on the left side of the stationary component in one embodiment of the present invention.
Figure 18:
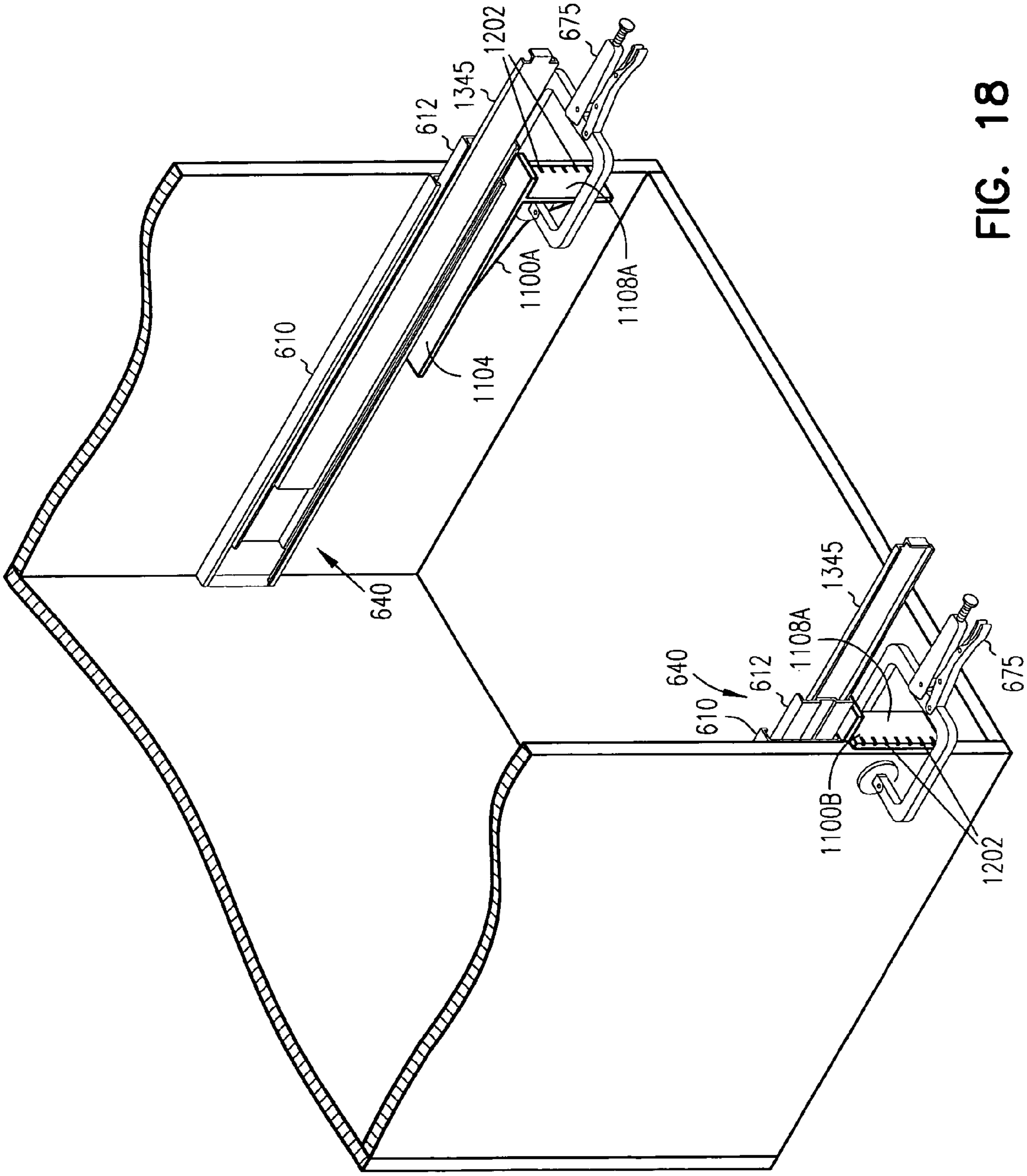
FIG. 18 is a perspective view of the non-magnetic right-sided slide mounting tool of FIG. 17 and a non-magnetic left-sided slide mounting tool clamped to a right side of the frameless stationary component in an inwardly-facing position, during or after installation of the stationary component sections to the stationary component in one embodiment of the present invention.
Figure 19:
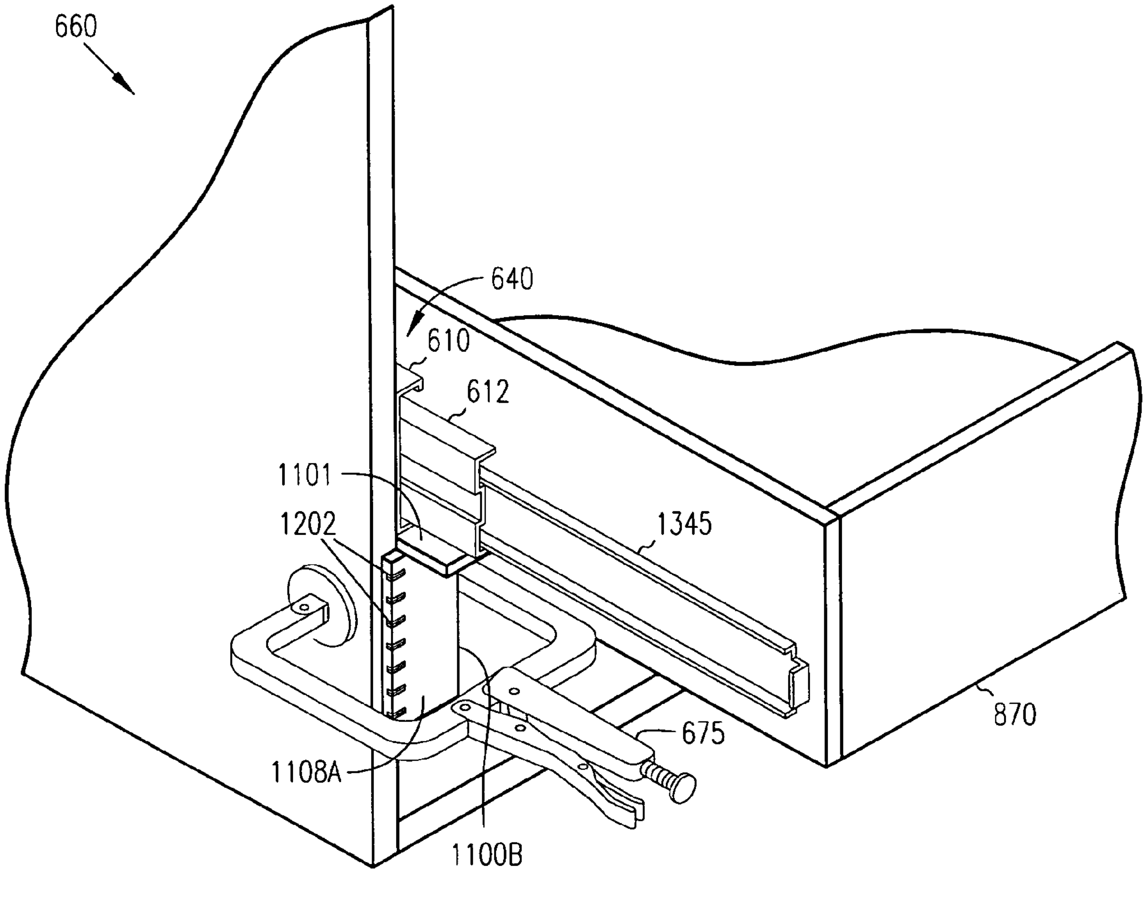
FIG. 19 is a perspective view of the non-magnetic right-sided slide mounting tool of FIG. 17 with a drawer balanced on the right-sided tool and left-sided tool (not shown), with the left moving component section of the slide in contact with the drawer in one embodiment of the present invention.
Figure 20:
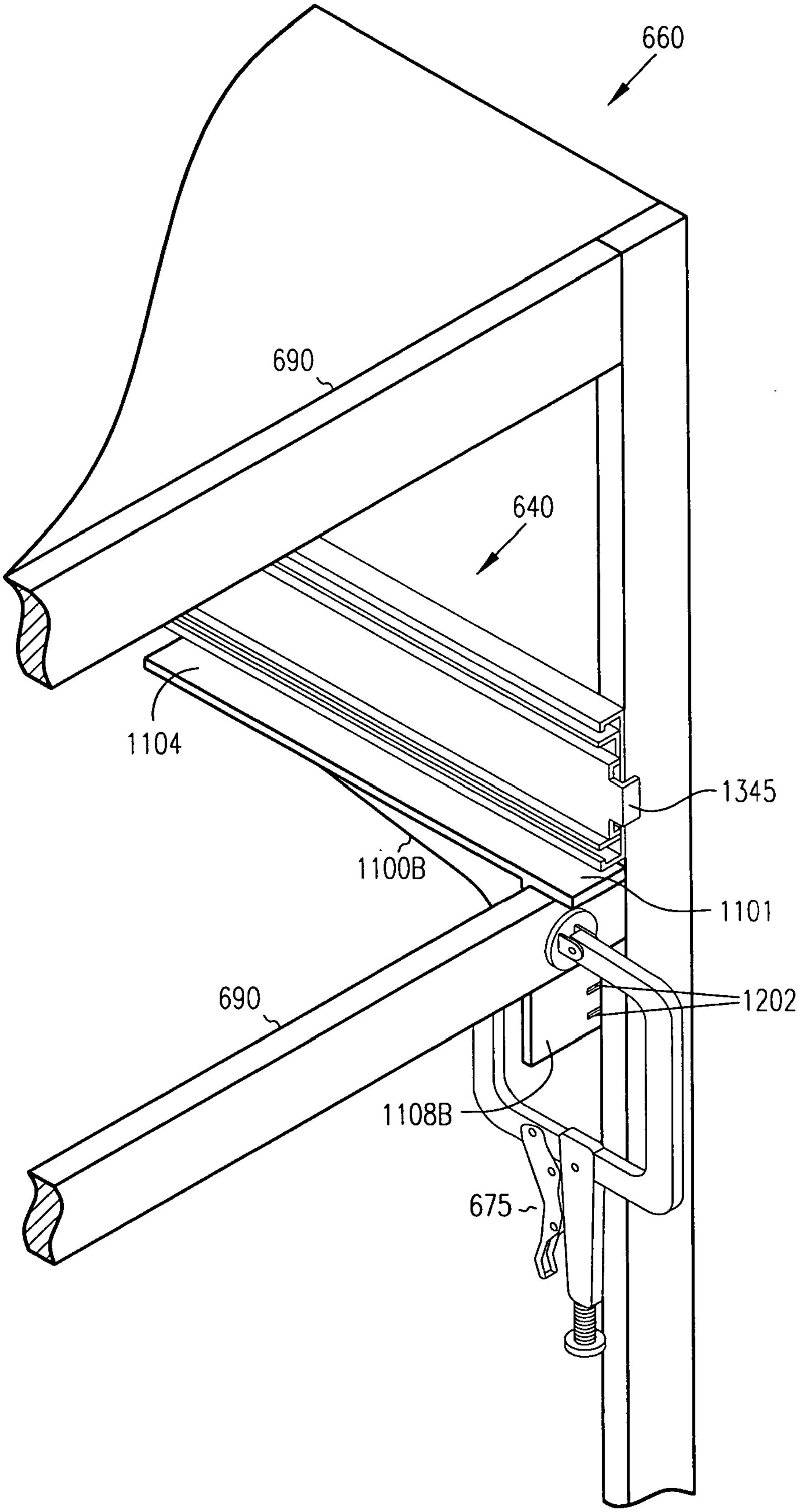
FIG. 20 is a perspective view of a non-magnetic left-sided slide mounting tool clamped to a rail of a stationary component in an inwardly-facing position during alignment and installation of a stationary component section of a full-extension slide to the left side of the stationary component in one embodiment of the present invention.

In an alternative embodiment, the non-magnetic mounting tools 1100A and 1100B are clamped to the stationary component 660 with the support portion 1103 facing inwardly, as is shown in FIGS. 17-20. This embodiment is particularly useful for frameless cabinets, although the invention is not so limited, as is discussed herein. In one embodiment, the left-sided tool 1100B is used on the right side of the stationary component. FIG. 17 shows the right-sided tool 1100A being used on the left side of the stationary component 660 Similarly, FIG. 20 shows the left-sided tool 1100B clamped to the right side of the stationary component 660, although the invention is not so limited. In other embodiments, the non-magnetic mounting tools 1100A and 1100B are essentially combined to form a multi-sided tool which comprises two second vertical components 1108B extending down on either side of the horizontal component 1104, with appropriate cutouts to allow a clamp to contact the "inner" second vertical portion 1108B. In this way, the non-magnetic mounting tool is reversible and can be used on either side of a stationary component whether facing inwardly or outwardly, and, in one embodiment, the non-magnetic mounting tools can have hatch marks (1202) as described above on both edges of the first vertical component (1108A).

Clamping the non-magnetic mounting tools 1100A and 1100B in this inwardly-facing orientation is useful for a variety of operations. For example, the arrangement in FIG. 17, with the right-sided non-magnetic mounting tool 1100A in contact with a bottom surface of the stationary component section 640 of the slide, in particular, with the fixed portion 610, as shown, places the right-sided non-magnetic mounting tool 1100A in the appropriate position to provide proper alignment for the moving component section 1345 of the slide onto a moving component (not shown). FIG. 18 provides a view of both the right-sided and left-sided non-magnetic tools, 1100A and 1100B, respectively, clamped to a frameless cabinet. In operation, the user would proceed as described above to balance the moving component 870 on both non-magnetic mounting tools 1100A and 1100B and secure the moving component section 1345 of the slide to the moving component. FIG. 19 is a perspective view of the non-magnetic right-sided slide mounting tool of FIG. 17 with a drawer balanced on the right-sided tool 1108A and left-sided tool (not shown), with the left moving component section 640 of the slide in contact with the drawer 870 in one embodiment of the present invention.

This arrangement shown in FIG. 18, with the right non-magnetic mounting tool 1108A clamped in an inwardly-facing direction to the left side of the stationary component 660 and the left non-magnetic mounting tool 1108B clamped in an inwardly facing direction to the right side of the stationary component 660 can also be used to align and install the stationary component sections 640 of each slide. Therefore, when either non-magnetic mounting tool 1100A or 1100B is clamped to a stationary component in the manner shown in FIGS. 17-20, it can be used to install a stationary component section 640 of virtually any type of slide onto the stationary component (although a modified configuration of the non-magnetic mounting tool would be needed to accommodate the lip present in the stationary component portions of bottom-mount slides). Although it does not have the magnetic coupling feature as described above for the magnetic mounting tool 100, the non-magnetic mounting tools 1100A and 1100B do provide the proper alignment so that the stationary component section 640 is aligned substantially horizontally as desired.

The non-magnetic mounting tools 1100A and 1100B can also be clamped in an inwardly-facing direction to stationary components having frames, to assist with alignment and installation of a stationary component section 640 of a slide on the stationary component 660. FIG. 20 shows the left-sided non-magnetic mounting tool 1100B clamped to a front rail 690 of the stationary component 660 in an inwardly-facing direction. In this embodiment, the left-sided non-magnetic mounting tool 1100B is being used to install the stationary component section 640 of a full-extension slide to a vertical surface on the inner right side of the stationary component 660.

Figure 21:
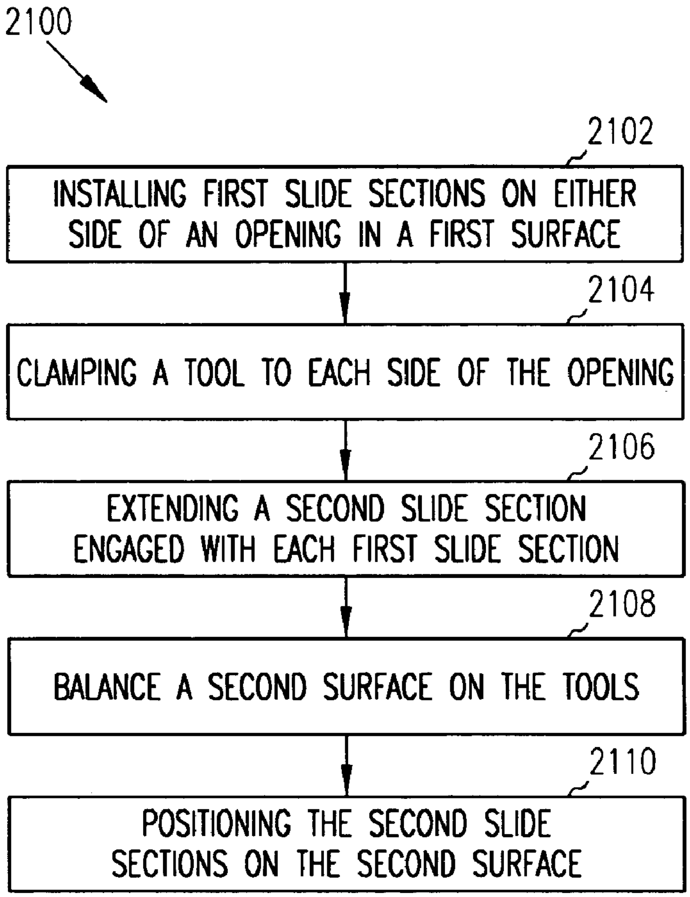
FIGS. 21 and 22 are block diagrams showing methods of aligning slides on a surface in embodiments of the present invention.

In one embodiment, the invention additionally or alternatively comprises a method for installing slides on a surface as shown in FIG. 21. The method 2100 comprises installing 2102 first slide sections on either side of an opening in a first surface; clamping 2104 a tool to each side of the opening; extending 2106 a second slide section engaged with each first slide section; balancing 2108 a second surface on the tools; and positioning 2110 the second slide sections on the second surface. In one embodiment, the first slide section is installed with a magnetic mounting tool. In one embodiment the first slide section is a stationary component section and the second slide section is a moving component section. In one embodiment, the first surface is connected to a front rail and the tools are clamped in an outwardly-facing direction. In one embodiment, the first surface is not connected to a front rail and the tools are clamped to the first surface in an inwardly-facing direction. In one embodiment, the invention further comprises securing the second slide section to the second surface. In one embodiment, the second slide section is secured to the second surface with screws. In one embodiment, the first surface is a stationary component, such as a cabinet. In one embodiment, the second surface is a drawer or shelf. In one embodiment, the second slide section is further extended using a trip mechanism located in the first slide section to provide access to a rear portion of the second surface and second slide section to allow the second slide section to be secured to the second surface in the rear portion. In one embodiment, the invention further comprises unclamping the tools from the first surface. In one embodiment, a moving component section of a full-extension slide is aligned and mounted with this tool.

Figure 22:
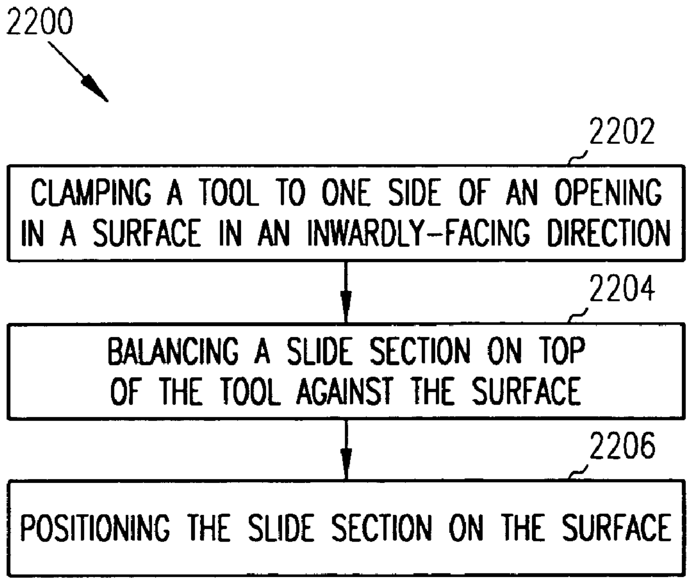

In one embodiment, the invention additionally or alternatively comprises a method for installing slides on a surface as shown in FIG. 22. The method 2200 comprises clamping 2202 a tool to one side of an opening in the surface in an inwardly-facing direction; balancing 2204 a slide section on top of the tool against the surface; and positioning 2206 the slide section on the surface. In one embodiment, the method further comprises installing the slide section to the surface. In one embodiment, the slide section is a stationary component section and the surface is a stationary component, such as a cabinet. In one embodiment, a stationary component section of any type of slide is aligned and mounted with this tool.

Embodiments of the present invention contain components arranged at right angles to each other. As a result, the various embodiments of the slide mounting tool are able to reference a stationary component slide section substantially perpendicular to a vertical surface in a structure, such as a framed or frameless cabinet. In one embodiment, the mounting tool holds the slide section in place with magnets. In another embodiment, the slide rests on a top surface of a substantially horizontal component of the mounting tool. In yet another embodiment, a pair of slide mounting tools provides support for a moving component, thus allowing installation of a moving component section of a slide substantially perpendicular to a vertical surface of the moving component, properly aligned for engagement with a stationary component section of a slide.

With use of the slide mounting tools of the present invention, near-perfect alignment of a variety of slide types, brands and sizes can now be obtained easily in a variety of structures with a single portable tool. In one embodiment, either stationary component sections and/or moving component sections of slides can be installed. In one embodiment, a combination of tools is used to align both stationary component sections of slides and moving component sections of slides. In a particular embodiment, a kit is provided comprising a first mounting tool for aligning a stationary component slide section on a stationary component, the mounting tool having at least one magnet; a second mounting tool for aligning a moving component slide section on a moving component, the second mounting tool having a toe portion and clampable to the stationary component; and instructions for using the first and second mounting tools.

Users can now, for the first time, align and install stationary component sections of slides having varying heights, thicknesses and lengths, oriented on edge or in a flat position on virtually any surface without the need to switch to a different tool, use a makeshift device and/or involve a second user. In one embodiment, the use of a stream-lined design together with one or more magnets allows stationary component sections of slides to be aligned and installed quickly and accurately. This is unlike conventional devices, which are designed for specific slides or are otherwise makeshift devices not intended specifically for use as slide alignment and installation devices. In one embodiment, markings on the handle aid in the positioning of the slide relative to other components at a glance. The installed slides are properly positioned quickly and easily, thus reducing labor costs and increasing ease of operation. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. An apparatus comprising:

an upper handle contiguous with a lower handle, wherein one or more magnets are secured to the upper handle;

a substantially horizontal component contiguous with the upper handle, wherein one or more magnets are secured to the substantially horizontal component; and a substantially vertical component contiguous with the lower handle.

2. The apparatus of claim 1 wherein the apparatus is capable of being used to install a stationary component slide section to a surface inside a stationary component.

3. The apparatus of claim 2 wherein the stationary component is a structure selected from the group consisting of cabinets, desks, armoires, entertainment centers, dressers, pantries and trucks.

4. A mounting system comprising:

a first slide mounting tool for magnetically coupling and aligning a stationary component slide section of a slide on a stationary component, the first slide mounting tool having an upper handle connected to a lower handle, wherein the upper handle is also connected to a substantially horizontal component and the lower handle is also connected to a substantially vertical component, the first slide mounting tool having at least one magnet securable to a component selected from the group consisting of the upper handle, the substantially horizontal component, the substantially vertical component, and combinations thereof; and a second slide mounting tool for aligning a stationary component slide section of a slide on a stationary component or a moving component slide section on a moving component, the second slide mounting tool having a first substantially vertical surface clampable to the stationary component and a second substantially vertical surface fixedly connected to one end of the first substantially vertical surface at a substantially perpendicular angle, wherein the second slide mounting tool has a substantially horizontal support portion connected to the first and second substantially vertical surfaces, wherein the substantially horizontal support portion extends beyond the second substantially vertical surface to form a tab portion.

5. The mounting system of claim 4 wherein the at least one magnet is securable to the upper handle in a substantially vertical position for magnetic coupling of the first slide mounting tool with the stationary component slide section positioned on edge against a vertical surface.

6. A kit comprising:

a first mounting tool for aligning a stationary component slide section on a stationary component, the first mounting tool having an upper handle connected to a lower handle, wherein the upper handle is also connected to a substantially horizontal component and the lower handle is also connected to a substantially vertical component, the mounting tool having at least one magnet securable to a component selected from the group consisting of the upper handle, the substantially horizontal component, the substantially vertical component, and combinations thereof;

a second mounting tool for aligning at least a moving component slide section on a moving component, the second mounting tool having a first substantially vertical surface clampable to the stationary component and a second substantially vertical surface fixedly connected to one end of the first substantially vertical surface at a substantially perpendicular angle, wherein the second mounting tool has a substantially horizontal support portion connected to the first and second substantially vertical surfaces, wherein the substantially horizontal support portion extends beyond the second substantially vertical surface to form a tab portion; and instructions for using the first and second mounting tools.

7. The kit of claim 6 wherein the second mounting tool is capable of being used to align and install a stationary component slide section or a moving component slide section.

8. The kit of claim 6 further comprising one or more clamps.

9. An apparatus comprising:

a magnetic slide mounting tool, the magnetic slide mounting tool having:

an upper handle with one or more openings, the upper handle connected to a lower handle having at least one opening sized for grasping;

a substantially horizontal component connected to the upper handle;

a substantially vertical component connected to the lower handle, the substantially vertical component having a front surface and a back surface; and one or more magnets securable to a component selected from the group consisting of the upper handle, the substantially horizontal component, the substantially vertical component, and combinations thereof, the one or more magnets for magnetically coupling the apparatus to a stationary component slide section.

10. The apparatus of claim 9 wherein the front surface has at least one lip extending outwardly on one side of the upper handle, the at least one lip for positioning a slide in a stationary component.

11. The apparatus of claim 9 further comprising two lips extending outwardly from the upper handle on opposing sides of the upper handle, the two lips connected to the front surface of the substantially vertical component.

12. The apparatus of claim 9 wherein the substantially vertical component is wider than the substantially horizontal component.

13. The apparatus of claim 9 wherein the upper handle is narrower than the lower handle.

14. The apparatus of claim 9 further comprising hatch markings on the back surface of the substantially vertical component for positioning the stationary component slide section.

15. The apparatus of claim 9 wherein the one or more magnets are securable to the upper handle in a substantially vertical position for magnetically coupling the apparatus to the stationary component slide section when the stationary component slide section is positioned on edge against a vertical surface.

16. The apparatus of claim 15 comprising at least two magnets, each of the at least two magnets securable to an upper handle cup located on opposing substantially vertical surfaces of the upper handle, wherein each upper handle cup is securable to the upper handle in an upper handle opening.

17. The apparatus of claim 16 further comprising at least one magnet securable to the substantially horizontal component in a substantially horizontal position for magnetically coupling the apparatus to the stationary component when the stationary component is in a flat position.

18. The apparatus of claim 17 comprising one magnet located in a substantially horizontal component cup securable to an opening in a bottom surface of the substantially horizontal component.

19. The apparatus of claim 9 wherein the one or more magnets are securable to the substantially horizontal component in a substantially horizontal position for magnetically coupling the apparatus to the stationary component when the stationary component is in a flat position.

20. The apparatus of claim 9 wherein at least one of the one or more magnets is combined with a cup.

21. The apparatus of claim 20 wherein at least one of the one or more magnets is a rare earth magnet.

22. The apparatus of claim 9 wherein the apparatus is capable of positioning the stationary component slide section for interaction with a moving component slide section installed on a moving component.

23. The apparatus of claim 9 wherein the magnetic slide mounting tool is made from materials selected from the group consisting of wood, metal, plastic and combinations thereof.

24. The apparatus of claim 9 further comprising a seam located along a longitudinal centerline of the upper handle, the lower handle, the substantially horizontal portion and the substantially vertical portion.

25. A method comprising:

clamping a non-magnetic slide mounting tool having a support portion to a stationary component, wherein the non-magnetic slide mounting tool has a first substantially vertical surface and a second substantially vertical surface perpendicular to the first substantially vertical surface;

aligning a stationary component slide section with the non-magnetic slide mounting tool, the stationary component slide section positioned against a first vertical surface inside the stationary component; and balancing a moving component on two non-magnetic slide mounting tools clamped to opposing outer surfaces of the stationary component, wherein a moving component section of a slide can be installed on the moving component in a position to interact with the stationary component slide section installed on the stationary component.

26. The method of claim 25 wherein the first substantially vertical surface is clamped to the stationary component, further wherein the support portion is a substantially horizontal support portion in contact with the first and second substantially vertical surfaces and contiguous with a substantially horizontal tab portion.

27. The method of claim 26 wherein the stationary component is a structure selected from the group consisting of cabinets, desks, armoires, entertainment centers, dressers, pantries and trucks and the moving component is a drawer or shelf.

28. The method of claim 27 wherein the stationary component is a cabinet and the moving component is a drawer or shelf.

29. The method of claim 26 wherein the non-magnetic slide mounting tool is clamped to the stationary component with the tab portion extending in an outwardly-facing direction, the tab portion designed to contact a top surface of a front rail secured to the stationary component.

30. The method of claim 29 wherein the moving component section is engaged with the stationary component slide section during installation of the moving component slide section on the moving component.

31. The method of claim 26 wherein the first substantially vertical surface is clamped to the stationary component with the tab portion extending in an inwardly-facing direction.

32. The method of claim 31 wherein the stationary component is a frameless cabinet.

33. The method of claim 31 wherein two moving component sections of two slides are aligned and installed on opposing outer surfaces of the moving component with the two non-magnetic slide mounting tools, each of the two moving component sections in a position to interact with the stationary component slide section installed on opposing vertical surfaces of the stationary component.

34. The method of claim 33 wherein each moving component slide section is engaged with its respective stationary component slide section during alignment and installation of the moving component slide section on the moving component with the two non-magnetic slide mounting tools.

35. The method of claim 31 wherein the stationary component slide section can be aligned on a top surface of the non-magnetic slide mounting tool and installed on edge against a vertical surface, the stationary component slide section positioned to interact with a moving component slide section installed on a moving component.

36. The method of claim 35 wherein the stationary component slide section is part of a bottom-mount slide, a frill-extension slide or a partial-extension slide.

37. The method of claim 36 wherein the moving component is a drawer or shelf.

38. The method of claim 31 wherein two stationary component slide sections are installed on edge against a vertical surface for use with two moving component sections installed on either side of the drawer or shelf.

39. A method comprising:

grasping a magnetic slide mounting tool;

magnetically coupling a first slide section to the magnetic slide mounting tool;

sliding the first slide section along the magnetic slide mounting tool until properly positioned on the tool;

contacting the first slide section with a first surface using the magnetic slide mounting tool;

positioning the first slide section on the first surface for use with a second slide section located on a second surface; and securing the first slide section to the first surface, wherein the first surface is part of a stationary component and the second surface is part of a moving component designed to move in and out of the stationary component.

40. The method of claim 39 wherein the first surface is a substantially vertical planar surface.

41. The method of claim 39 wherein the first surface comprises a front substantially horizontal surface and a rear substantially vertical surface.

42. The method of claim 41 wherein the first slide section contacts the rear substantially vertical surface indirectly with a socket.

43. The method of claim 42 wherein the first substantially vertical surface, at least a portion of the second substantially vertical surface, and the substantially horizontal support portion are integral.

44. The method of claim 42 wherein the substantially horizontal tab portion is designed to contact a top surface of a front rail being secured to a stationary component.

45. The method of claim 42 wherein the stationary component is a structure selected from the group consisting of cabinets, desks, armoires, entertainment centers, dressers, pantries and trucks and the moving component is a drawer or shelf.

46. The method of claim 45 wherein the non-magnetic slide mounting tool is useful for installing a stationary component section on the stationary component.

47. The method of claim 46 wherein the stationary component section is part of a bottom-mount slide, a full-extension slide or a partial-extension slide.

48. The method of claim 39 further comprising, prior to securing the first slide section to the first planar surface, clamping the first slide section and magnetic slide mounting tool to the first surface.

49. An apparatus comprising:

a non-magnetic slide mounting tool having:

a first substantially vertical surface clampable to a stationary component;

a second substantially vertical surface fixedly connected to one end of the first substantially vertical surface at a substantially perpendicular angle; and a substantially horizontal support portion connected to the first and second substantially vertical surfaces, wherein the substantially horizontal support portion extends beyond the second substantially vertical surface to form a tab portion, the substantially horizontal support portion having a top surface and a bottom surface substantially parallel thereto, wherein the top and bottom surfaces each extend between a first edge and a second edge, further wherein the first substantially vertical surface is connected to the substantially horizontal support portion along the first edge and the second substantially vertical surface includes a hatch section containing hatch marks, the hatch section located on a portion of the second substantially vertical surface which extends beyond the first edge of the substantially horizontal support portion.

50. The apparatus of claim 49 wherein the non-magnetic slide mounting tool is made from materials selected from the group consisting of wood, metal and plastic.

51. The apparatus of claim 49 wherein the first substantially vertical surface, the second substantially vertical surface and at least a portion of the substantially horizontal support portion are integral.

52. An apparatus comprising:

a non-magnetic slide mounting tool having:

a first substantially vertical surface clampable to a stationary component;

a second substantially vertical surface fixedly connected to one end of the first substantially vertical surface at a substantially perpendicular angle; and a substantially horizontal support portion connected to the first and second substantially vertical surfaces, wherein the substantially horizontal support portion extends beyond the second substantially vertical surface to form a tab portion, the substantially horizontal support portion having a top surface and a bottom surface substantially parallel thereto, wherein the top and bottom surfaces each extend between a first edge and a second edge, further wherein the first substantially vertical surface is connected to the substantially horizontal support portion along the second edge and the second substantially vertical surface includes a hatch section containing hatch marks, the hatch section located on a portion of the second substantially vertical surface which extends beyond the second edge of the substantially horizontal support portion.

53. The apparatus of claim 52 wherein the non-magnetic slide mounting tool is made from materials selected from the group consisting of wood, metal and plastic.

54. The apparatus of claim 52 wherein the first substantially vertical surface, the second substantially vertical surface and at least a portion of the substantially horizontal support portion are integral.

* * * * *

UNITED STATES PATENT AND TRADEMARK OFFICE

CERTIFICATE OF CORRECTION

PATENT NO. : 7,281,338 B2
APPLICATION NO. : 10/954637
DATED : October 16, 2007
INVENTOR(S) : Ziegmann et al.

It is certified that error appears in the above-identified patent and that said Letters Patent is hereby corrected as shown below:

In column 2, line 20, delete “fill” and insert -- full --, therefor.

In column 7, line 40, delete “fill-extension” and insert -- full-extension --, therefor.

In column 22, line 58, delete “fill-” and insert -- full- --, therefor.

In column 24, line 7, after “660” insert -- . --.

In column 28, line 7, in Claim 11, delete “claim 9” and insert -- claim 10 --, therefor.

In column 29, line 61, in Claim 36, delete “frill-extension” and insert -- full-extension --, therefor.

Signed and Sealed this

Fifteenth Day of April, 2008

Jon W. Dudas

JON W. DUDAS
*Director of the United States Patent and Trademark Office*